(12) United States Patent
Allen et al.

(10) Patent No.: US 10,896,377 B2
(45) Date of Patent: Jan. 19, 2021

(54) CATEGORIZING CONCEPT TERMS FOR GAME-BASED TRAINING IN COGNITIVE COMPUTING SYSTEMS

(71) Applicant: International Business Machines Corporation, Armonk, NY (US)

(72) Inventors: Corville O. Allen, Morrisville, NC (US); Phaedra Boinodiris, Apex, NC (US); Joseph N. Kozhaya, Morrisville, NC (US); Christopher M. Madison, Charlotte, NC (US); Sridhar Sudarsan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 14/919,819

(22) Filed: Oct. 22, 2015

(65) Prior Publication Data
US 2017/0076226 A1   Mar. 16, 2017

Related U.S. Application Data

(63) Continuation-in-part of application No. 14/849,741, filed on Sep. 10, 2015.

(51) Int. Cl.
*G06N 5/04*      (2006.01)
*G06F 16/36*     (2019.01)
(Continued)

(52) U.S. Cl.
CPC .......... *G06N 5/04* (2013.01); *G06F 16/3329* (2019.01); *G06F 16/3344* (2019.01);
(Continued)

(58) Field of Classification Search
CPC ................ G06N 5/04; G06F 17/30654; G06F 17/30684; G06F 17/30731; A63F 13/35; A63F 13/46; A63F 13/79
See application file for complete search history.

(56) References Cited

U.S. PATENT DOCUMENTS 6,623,009 B1   9/2003   Kraemer et al.
8,386,489 B2   2/2013   Peoples et al.
(Continued)

OTHER PUBLICATIONS

Ainsworth, et al., "The functions of multiple representations", Computers & Education 33 (1999) 131-152 (Year: 1999).*
(Continued)

*Primary Examiner* — Robert A Cassity
*Assistant Examiner* — Tsu-Chang Lee
(74) *Attorney, Agent, or Firm* — Grant M. McNeilly

(57) ABSTRACT

A first list that includes a first set of one or more concept terms may be obtained. The first set of one or more concept terms may be candidates for being conceptually related to a seed concept term. Prior to the obtaining, a first client computing device may provide a first plurality of individual characters and the seed concept term to a first user using the first client computing device. The first client computing device may prompt the first user to generate the first set of one or more concept terms that are conceptually related to the seed concept term using one or more of the first plurality of individual characters. In response to the obtaining, one or more particular categories to which each of the first set of one or more concept terms belongs may be determined.

20 Claims, 8 Drawing Sheets

(51) Int. Cl.
  *G06F 16/332* (2019.01)
  *G06F 16/33* (2019.01)
  *A63F 13/35* (2014.01)
  *A63F 13/46* (2014.01)
  *A63F 13/79* (2014.01)

(52) U.S. Cl.
  CPC .............. *G06F 16/36* (2019.01); *A63F 13/35* (2014.09); *A63F 13/46* (2014.09); *A63F 13/79* (2014.09)

(56) References Cited

U.S. PATENT DOCUMENTS

| | | | |
|---|---|---|---|
| 8,386,490 | B2 | 2/2013 | Jiang et al. |
| 8,645,378 | B2 | 2/2014 | Knight et al. |
| 9,514,405 | B2 | 12/2016 | Chen et al. |
| 2004/0242295 | A1* | 12/2004 | Ghaly .................. A63F 3/0421 463/10 |
| 2010/0153092 | A1 | 6/2010 | Peoples et al. |
| 2011/0040774 | A1* | 2/2011 | Peoples ............. G06F 17/30746 707/765 |
| 2011/0230246 | A1 | 9/2011 | Brook |
| 2013/0144605 | A1 | 6/2013 | Brager |
| 2014/0011557 | A1 | 1/2014 | Coyle |
| 2014/0282586 | A1* | 9/2014 | Shear .................... G06F 9/5072 718/104 |
| 2015/0227834 | A1* | 8/2015 | Christophe ............ G06N 5/022 706/46 |

OTHER PUBLICATIONS

Simko et al., "Semantics Discovery via Human Computation Games," Slovak University of Technology, 23 pages, Slovak Republic, http://www2.fiit.stuba.sk/~bielik/publ/abstracts/2011/ijswis-jsimko-tvarozek-bielik2011.pdf).

Unknown, "ESP game," Wikipedia, last modified Feb. 10, 2015 at 12:19, 3 pages, printed on Jun. 24, 2015, https://en.wikipedia.org/wiki/ESP_game.

Unknown, "EteRNA," Wikipedia, last modified Oct. 8, 2014 at 06:53, 3 pages, printed on Jun. 24, 2015, https://en.wikipedia.org/wiki/EteRNA.

Unknown, "Foldit," Wikipedia, last modified May 8, 2015 at 01:50, 5 pages, printed on Jun. 24, 2015, https://en.wikipedia.org/wiki/Foldit.

Boinodiris et al., "Gamed-Based Training for Cognitive Computing Systems," U.S. Appl. No. 14/849,741, filed Sep. 10, 2015.

List of IBM Patents or Patent Applications Treated as Related, dated Oct. 21, 2015, 2 pages.

* cited by examiner

CATEGORIZING CONCEPT TERMS FOR GAME-BASED TRAINING IN COGNITIVE COMPUTING SYSTEMS

BACKGROUND

The present disclosure relates to cognitive computing systems, and more specifically to game-based training for cognitive computing systems.

Recent research has been directed to developing cognitive computing systems (e.g., concept expansion systems, question answering (QA) systems, etc.). Cognitive computing systems may build knowledge and learn (e.g., via training), understand natural language, reason, quickly identify new patterns, put content in context with confidence scores, analyze terms and interpret the terms' meanings, all of which may ultimately model human intelligence. For example, QA systems may be designed to receive input questions, analyze them, and return applicable candidate answers. These systems may rely on natural language processing, automated reasoning, machine learning, and other advanced techniques. Using these techniques, QA systems may provide mechanisms for searching large sources of content and analyzing the content with regard to a given input question in order to determine an answer to the question. In some QA systems this may take the form of hypothesis generation, scoring, and ranking in order to determine a final set of one or more output answers.

SUMMARY

Embodiments of the present disclosure may include a method, a system, and a computer program product. A cognitive computing system may obtain a first list that includes a first set of one or more concept terms. The first set of one or more concept terms may be transmitted from a first client computing device to the cognitive computing system. The first set of one or more concept terms may be candidates for being conceptually related to a seed concept term. Prior to the obtaining, the first client computing device may provide a first plurality of individual characters and the seed concept term to a first user using the first client computing device. The first client computing device may prompt the first user to generate the first set of one or more concept terms that are conceptually related to the seed concept term using one or more of the first plurality of individual characters. The cognitive computing system may determine, in response to the obtaining, one or more particular categories to which each of the first set of one or more concept terms belongs to. Each of the particular categories may be a distinct class that includes an identification. The identification may describes a specific meaning for each of the first set of one or more concept terms.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
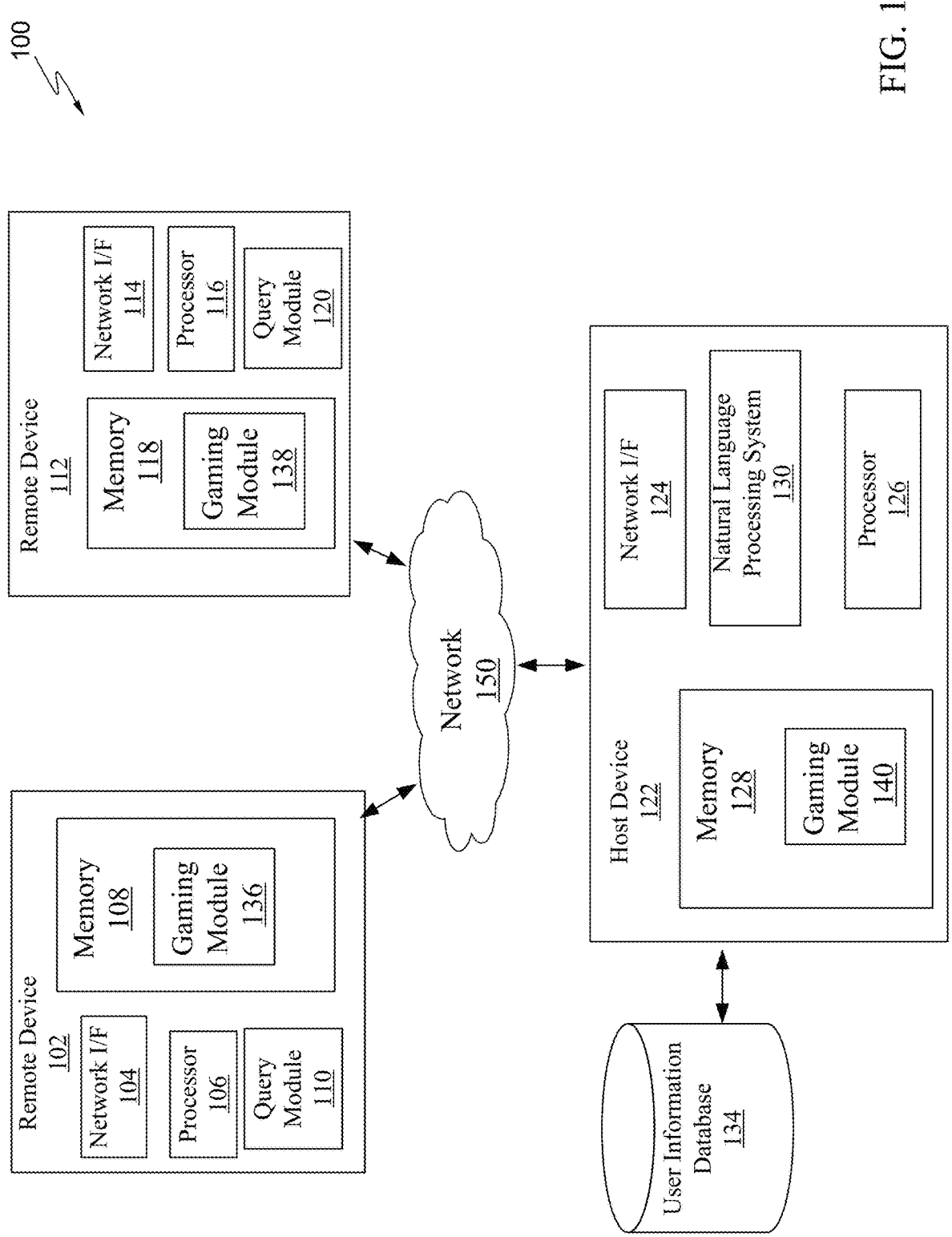
FIG. 1 illustrates a block diagram of an example computing environment, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to game-based training for cognitive computing systems. While the present disclosure is not necessarily limited to such applications, various aspects of the disclosure may be appreciated through a discussion of various examples using this context.

Cognitive computing systems may analyze terms and interpret the terms' meanings. For example, cognitive computing systems may perform concept expansion. Concept expansion is the process of inputting a set (i.e., one or more) of seed concept terms that are expanded by the cognitive computing system to a more complete set of concept terms, which belong to the same category or semantic class. A "seed concept term" as disclosed herein is a set of words, acronyms, or other statements that may be initially input into the cognitive computing system. A non-seed or expanded "concept term" as disclosed herein is an additional set of words, acronyms, or other statements that the cognitive computing system or user inputs to expand on the original seed concept terms with a more complete set of concept terms. A "semantic class" may refer to a broad category, description, and/or meaning to which a concept term belongs to.

In an example illustration, a person may be interested in learning about medicinal drugs that are related to the drugs he or she already knows about for remedial purposes. Accordingly, for the semantic class of drugs, the person may input into the concept expansion system a set of 3 seed concept terms, "motrin, aspirin, and keflex." The concept expansion system may then access from its information corpus (described more below) a set of conceptually related expanded concept terms in order to expand the initial set of seed concept terms from 3 to the following 16 concept terms: "allegra, lisinopril, metformin, equagesic, cimetidine, fiorinal, vancomycin, avelox, protinix, glimepiride, protonix, verapamil, norco, inderal, hctz, and advair."

Concept expansion systems and cognitive computing systems in general may be useful because human-input concept terms, whether seed concept terms or expanded concept terms may often be missing from dictionaries. These often missed terms may include, for example, acronyms, abbreviations, spelling variants, informal shorthand terms (e.g., "abx" for "antibiotics") and composite terms (e.g., "may-december," or "virus/worm"). Further, new words may continually be developing, which may only be available on social medial portals. Concept expansion itself may be useful, for example, for search engines to collect large sets of concept terms to better interpret queries. Further, QA systems can utilize concept expansion to deal with list questions.

Cognitive computing systems may have to be trained before they are fully capable simulating intelligence. Training is the process of building knowledge and learning a concept correctly or consistently. Currently, in order for a cognitive computing system to fully train, a subject matter expert (SME) may have to be utilized to make sure data returned to users from the cognitive computing system is accurate or consistent. SMEs for cognitive computing are people that have expertise in a particular domain that help train the cognitive computing systems within that domain, and help identify and upload content to form a knowledge base (e.g., information corpus). A "domain" as disclosed herein is a particular field of knowledge, specialty, industry, etc. (e.g., medicine). In an example illustration, SMEs may create question and answer pairs that form an answer key within a QA system.

Regarding concept expansion, SMEs may determine whether the cognitive computing system identifies correct expanded concept terms from the seed concept terms. For example, the SME may first input a set of seed concept terms to the cognitive computing system. The cognitive computing system may initially access and return 100 expanded concept terms. The SME may then have to arduously parse through each of the 100 expanded concept terms to determine the validity of the concept terms in relation to the seed concept terms. The SME may then only select a portion of the 100 expanded concept terms (e.g., 20) that are valid concept terms. The SME may then input the portion of valid concept terms into the cognitive computing system's knowledge repository (e.g., information corpus) such that when a user later inputs the same set of seed concept terms, the returned expanded concept terms may reflect the portion of valid concepts that the SME selected during training. The other non-valid concept terms may be filtered out such that the cognitive computing system does not utilize the concept terms. The duties of SMEs may therefore be very cumbersome and may waste valuable resources, such as time and money. Further, by only implementing one or a few SMEs, determining whether concept terms are valid may reflect a bias of those few SMEs during training. Therefore, embodiments of the present disclosure are directed to utilizing crowdsourcing and game-based cognitive computing system training such that a select few SMEs do not engage in resource-consuming tasks and SMEs do not have to be heavily relied on. Further embodiments of the present disclosure are directed to categorizing each of a first set of concept terms that a user generates for the game-based training and causing the client computing device associated with the user to prompt the user to generate a second set of concept terms conceptually related to the first set of concept terms, as described in more detail below.

As disclosed herein, to generate one or more concept terms that are "conceptually related" with seed concept terms means that concept terms and seed concept terms may be related by way of being synonyms, hypenyms, holonyms, hyponyms, merronyms, coordinate terms, verb particles, troponyms, entailments, or any other types of being associated. As described herein, the term "characters," may refer to letters, numbers, symbols, alpha-numeric characters, or any other sub-unit of a concept term or seed concept term.

FIG. 1 is a block diagram of an example computing environment 100, consistent with embodiments of the present disclosure. In some embodiments, the computing environment 100 may include one or more remote devices 102, 112 (e.g., client computing devices) and one or more host devices 122 (e.g., cognitive computing systems or server computing device). Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In some embodiments, the network 150 can be implemented by any number of any suitable communications media (e.g., wide area network (WAN), local area network (LAN), Internet, intranet, etc.). Alternatively, remote devices 102, 112 and host devices 122 may be local to each other, and communicate via any appropriate local communication medium (e.g., local area network (LAN), hardwire, wireless link, intranet, etc.). In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 150.

In some embodiments, host device 122 may include a natural language processing (NLP) system 130, which is described in more detail below. The host device 122 may further include a user information database 134. The user information database 134 may include information about users such as identities of users, authentication information (e.g., username and password), game scores of particular users (discussed in more detail below), and subject matter expertise of users (e.g., title, career specialty, talents, etc.). Subject matter expertise of a user may be utilized by the host device 122 for determining a validity of concept terms that a user generates when comparing a domain with the user's subject matter expertise, as described in more detail below.

In some embodiments, remote devices 102, 112 may enable users to submit questions (e.g., search requests, potential research questions, or other user queries) to host devices 122 to retrieve search results. For example, the remote devices 102, 112 may include a query module 110, 120 (e.g., in the form of a web browser or any other suitable software module) and present a graphical user interface (GUI) or other interface (e.g., command line prompts, menu screens, etc.) to solicit queries from users for submission to one or more host devices 122 and to display answers/results obtained from the host devices 122 in relation to such user queries.

Consistent with various embodiments, host device 122 and remote devices 102, 112 may be computer systems, and may each be equipped with a display or monitor. The computer systems may include at least one processor 106, 116, 126; memories 108, 118, 128; internal or external network interface or communications devices 104, 114, 124 (e.g., modem, network cards, etc.); optional input devices (e.g., a keyboard, mouse, or other input device); and any commercially available or custom software (e.g., browser software, communications software, server software, NLP software, search engine and/or web crawling software, filter modules for filtering content based upon predefined criteria, etc.). In some embodiments, the computer systems may include servers, desktops, laptops, and hand-held devices (e.g., mobile phones, touch pads, smart watches, etc.).

Consistent with various embodiments, the remote devices 102 and 112 may include respective gaming modules 136 and 138. In some embodiments, as illustrated in FIG. 1, the gaming modules 136 and 138 may be computer-readable program instructions that are stored within the memories 108 and 118 respectively. In various embodiments, the gaming modules 136 and/or 138 may be configured for providing (e.g., displaying) a plurality of individual characters and one or more seed concept terms and prompting a user of the respective remote devices 102 and 112 to generate a set of one or more expanded concept terms that are conceptually related to the seed concept term, using one or more of the plurality of individual characters, as described in more detail below. Further the gaming modules 136 and 138 may be configured for providing game scores to users of the remote devices 102 and 112, which correspond to point totals earned by the users for generating the expanded concept terms. This and other functions for which the gaming modules 136 and 138 are configured are explained in further detail below.

In various embodiments, the host device 122 may also include its own gaming module 140, which may be computer readable program instructions stored in the memory 128. The gaming module 140, in some embodiments, may be configured for providing a seed concept term and a plurality of individual characters to each of the remote devices 102 and 112 (e.g., cause the seed concept term and plurality of characters to be displayed), and prompting (e.g., causing a remote device to display a notification to) a user of the remote devices 102 and 112 to generate a second set of one or more concept terms that are conceptually related to the seed concept term, which is described in more detail below. The gaming module 140 may further be configured for receiving a list of expanded concept terms generated by users of remote devices 102 and 112, and comparing the list of expanded concept terms with concept terms the host device 122 has generated that are candidates for being conceptually related. The gaming module 140 may then determine whether any of the concept terms that are candidates are included on the list and alter a validity score of the candidates of expanded concept terms, or those expanded concept terms that the users generated, based on the determining. These and other functions of the gaming module 140 are described in more detail below.

In some embodiments, the host device 122 may be a server computing device that includes the gaming module 140 but not the natural language processing system 130. In these embodiments, the server computing device may transmit a list of concept terms that a user has generated to a cognitive computing system that includes the natural language processing system 130. Consistent with other embodiments, the host device 122 may be a cognitive computing system that includes the natural language processing system 130 but not the gaming module 140 such that the host device 122 may be mainly responsible for performing concept expansion, QA generation, storing valid concept terms, etc. Accordingly, the cognitive computing system may be responsible for receiving information from another server computing device, as described above. As illustrated in FIG. 1, in some embodiments, the host device 122 may be a server computing device and cognitive computing system such that the host device 122 includes both the gaming module 140 and the natural language processing system 130.

Figure 2:
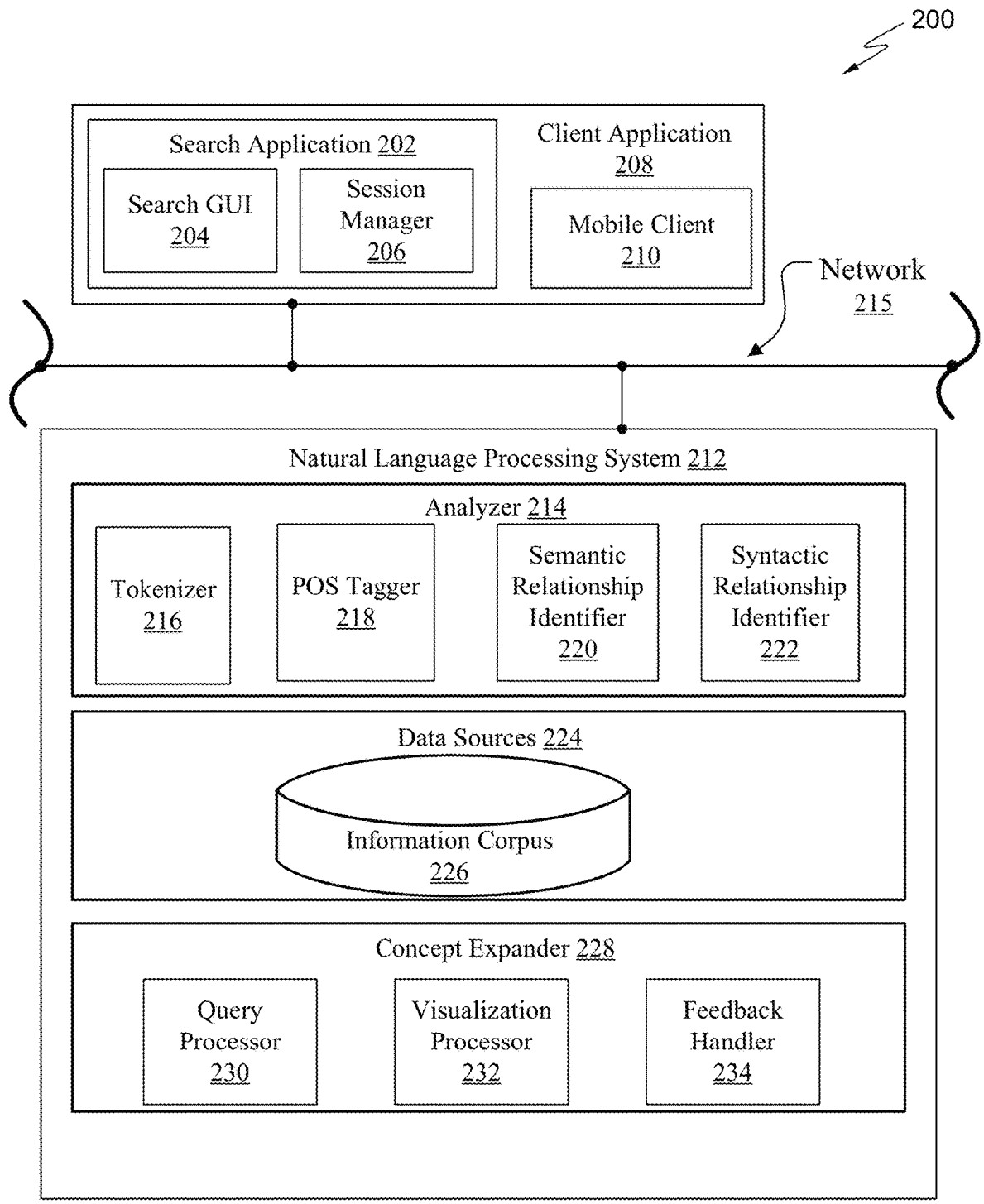
FIG. 2 illustrates a block diagram of a natural language processing (NLP) system usable to generate answer estimates to one or more questions, expand seed concept terms, etc., consistent with embodiments of the present disclosure.

FIG. 2 is a block diagram of an example NLP system 212 usable to generate answers to one or more questions, expand seed concept terms, etc., consistent with embodiments of the present disclosure. The NLP system 212 may be configured for generating a set of concept terms that are candidates for being conceptually related to a given seed concept term. Aspects of FIG. 2 are directed toward an exemplary system architecture 200, including a NLP system 212 to expand seed concept terms. In some embodiments, one or more users can send requests for information to the NLP system 212 using a remote device (such as remote devices 102, 112 of FIG. 1). Such a remote device may include a client application 208 which may itself involve one or more entities operable to generate information that is then dispatched to system 212 via network 215. NLP system 212 may be able to perform methods and techniques for responding to the requests sent by the client application 208. In some embodiments, the information received at NLP system 212 may correspond to input questions received from users, where the input questions may be expressed in a free form and in natural language. In some embodiments, the information received at NLP system 212 may correspond to input seed concept terms received from users, or expanded concept terms obtained from users.

A query or input (e.g., question) may be one or more words that form a search term or request for data, information, or knowledge. The input may be expressed in the form of one or more keywords. Input may include various selection criteria and search terms. An input may be composed of complex linguistic features in addition to keywords. However, a keyword-based search for answers to the inputs may also be possible. In some embodiments, using restricted syntax for questions posed by users may be enabled. The use of restricted syntax may result in a variety of alternative expressions that assist users in better stating their needs.

Consistent with various embodiments, client application 208 may operate on a variety of devices. Such devices may include, but are not limited to, mobile and handheld devices (e.g., laptops, mobile phones, personal or enterprise digital assistants, and the like), personal computers, servers, or other computer systems that access the services and functionality provided by NLP system 212. In some embodiments, client application 208 may include one or more components, such as a mobile client 210. Mobile client 210, acting as an agent of client application 208, may dispatch user query requests to NLP system 212.

Consistent with various embodiments, client application 208 may also include a search application 202, either as part of mobile client 210 or separately, that may perform several functions, including some or all of the above functions of mobile client 210 listed above. For example, in some embodiments, search application 202 may dispatch requests for information to the NLP system 212. In some embodiments, search application 202 may be a client application to NLP system 212. Search application 202 may send requests for candidate answers to NLP system 212. Search application 202 may be installed on a personal computer, a server, or other computer system. In some embodiments, the mobile client 208 may include a gaming GUI for use in prompting a user of the mobile client 208 to input a set of seed concept term such that the NLP system 212 may generate an expanded list of concept terms.

In some embodiments, search application 202 may include a search GUI 204 and session manager 206. In such situations, users may be able to enter questions or seed concept terms in search GUI 204. In some embodiments, search GUI 204 may be a search box or other GUI component, the content of which can represent input to be submitted to NLP system 212. Users may authenticate to NLP system 212 via session manager 206. In some embodiments, session manager 206 may keep track of user activity across sessions of interaction with the NLP system 212. Session manager 206 may also keep track of what questions or concept terms are submitted within the lifecycle of a session of a user. For example, session manager 206 may retain a succession of questions posed by a user during a session. In some embodiments, answers or concept expansion terms are produced by NLP system 212 in response to questions or seed concept terms. Information for sessions managed by session manager 206 may be shared between computer systems and devices.

In some embodiments, client application 208 and NLP system 212 may be communicatively coupled through network 215, e.g., the Internet, intranet, or other public or private computer network. In some embodiments, NLP system 212 and client application 208 may communicate by using Hypertext Transfer Protocol (HTTP), Representational State Transfer (REST) calls, or any other suitable protocol. In some embodiments, NLP system 212 may reside on a server node. Client application 208 may establish server-client communication with NLP system 212 or vice versa. In some embodiments, the network 215 can be implemented within a cloud computing environment, or using one or more cloud computing services.

Consistent with various embodiments, NLP system 212 may respond to the requests for information sent by client applications 208 (e.g., seed concept terms posed by users). NLP system 212 may generate expanded concept terms according to the received seed concept terms, the semantic class, and domain. In some embodiments, NLP system 212 may include an analyzer 214, data sources 224, and a concept expander 228 (or answer generator). Analyzer 214 may be a computer module (e.g., Natural Language Processing (NLP) module) that analyzes the received questions or concept terms. Analyzer 214 may perform various methods and techniques for analyzing structured data (e.g., data from databases), unstructured data (e.g., data from a web page), and/or multimedia (e.g., images, audio, video, etc.). For example, the question analyzer 214 may utilize syntactic analysis and semantic analysis, as described below.

In some embodiments, analyzer 214 parses passages of documents. Analyzer 214 may include various modules to perform analyses of received questions or concept terms. For example, computer modules that analyzer 214 may encompass, but are not limited to, may include a tokenizer 216, a part-of-speech (POS) tagger 218, a semantic relationship identifier 220, and a syntactic relationship identifier 222.

In some embodiments, tokenizer 216 may be a computer module that performs lexical analysis. Tokenizer 216 may convert a sequence of characters into a sequence of tokens. A token may be a string of characters included in an electronic document and categorized as a meaningful symbol. Further, in some embodiments, tokenizer 216 may identify word boundaries in an electronic document and break any text passages within the document into their component text elements, such as words, multiword tokens, numbers, and punctuation marks. In some embodiments, tokenizer 216 may receive a string of characters, identify the lexemes in the string, and categorize them into tokens.

Consistent with various embodiments, POS tagger 218 may be a computer module that marks up a word in passages to correspond to a particular part of speech and/or category. POS tagger 218 may read a passage or other text in natural language and assign a part of speech or category to each word or other token. POS tagger 218 may determine the part of speech to which a word (or other text element) corresponds based on the definition of the word and the context of the word. The context of a word may be based on its relationship with adjacent and related words in a phrase, sentence, question, or paragraph. In some embodiments, the context of a word may be dependent on one or more previously analyzed electronic documents (e.g., the content of one source document may shed light on the meaning of text elements in another source document). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, POS tagger 218 may tag or otherwise annotate tokens of a passage with part of speech categories. In some embodiments, POS tagger 218 may tag tokens or words of a passage to be parsed by the NLP system 212.

In some embodiments, semantic relationship identifier 220 may be a computer module that may identify semantic relationships and/or domains of recognized text elements (e.g., words, phrases) in documents. In some embodiments, semantic relationship identifier 220 may determine functional dependencies between entities and other semantic relationships. For example, when a user generates a set of seed concept terms for the NLP system 212 to analyze (e.g., apple, orange, and cherry), the semantic relationship identifier 220 may first identify the semantic class of the terms (e.g., fruit) to perform further analyses.

Consistent with various embodiments, syntactic relationship identifier 222 may be a computer module that may identify syntactic relationships in a passage composed of tokens. Syntactic relationship identifier 222 may determine the grammatical structure of sentences, for example, which groups of words are associated as phrases and which word is the subject or object of a verb. Syntactic relationship identifier 222 may conform to formal grammar.

In some embodiments, the analyzer 214 may be a computer module that can parse a received user query or concept terms and generate a corresponding data structure of the user query. For example, in response to receiving a question at the NLP system 212, analyzer 214 may output the parsed question as a data structure. In some embodiments, the parsed question may be represented in the form of a parse tree or other graph structure. To generate the parsed question, the analyzer 214 may trigger computer modules 216, 218, 220, and 222. Additionally, in some embodiments, question analyzer 214 may use external computer systems for dedicated tasks that are part of the question parsing process.

In some embodiments, the concept expander 228 (or answer generator) may be a computer module that generates expanded concept terms that are candidates for being conceptually related to a seed concept term, or candidate answers to posed questions. Examples of concept terms generated by concept expander 228 may include, but are not limited to, responses in the form of natural language sentences; reports, charts, or other analytic representation; raw data; web pages; and the like.

In some embodiments, the output of the analyzer 214 may be used by search application 202 to perform a search of a set of corpora to retrieve one or more expanded concept terms or candidate answer estimates to link to received questions. As used herein, a corpus may refer to one or more data sources. In an example illustration, if a user proposed a set a seed concept terms via the search application 202, the target documents within the corpora utilized to expand the seed concept terms to other concept terms may include concept terms gathered from social media, scientific articles, newspaper articles, books, videos, questionnaires, medical transcriptions, etc. For example, a user may desire to expand upon his or her knowledge of U.S. presidents. Accordingly, the user may input the seed concept terms of Bush, Clinton, and Reagan. The search application 202 may then search within the corpora (e.g., information corpus 226) and locate within various uploaded electronic books to find the names of Lincoln, Washington, and other presidents. Accordingly, the NLP system 212 may return to the user the expanded list of concept terms or additional names of Lincoln, Washington, and other presidents.

In some embodiments, data sources 224 may include data warehouses, information corpora, data models, multimedia, and document repositories. In some embodiments, the data source 224 may include an information corpus 226. The information corpus 226 may enable data storage and retrieval. In some embodiments, the information corpus 226 may be a storage mechanism that houses a standardized, consistent, clean and integrated form of potential target documents (e.g., newspaper articles, published studies, books, etc.). The information corpus may store each seed concept term and its associated expanded concepts. The data may be sourced from various operational systems. Data stored in the information corpus 226 may be structured in a way to specifically address reporting and analytic requirements. In some embodiments, the information corpus may be a relational database.

Consistent with various embodiments, concept expander 228 may include query processor 230, visualization processor 232, and feedback handler 234. When information in a data source 224 that matches a parsed question or expands upon an original seed concept term is located, a technical query can be executed by query processor 230. Based on data retrieved by a technical query executed by query processor 230, visualization processor 232 may be able to render visualization of the retrieved data, where the visualization represents the candidate answers or candidate expanded list of concept terms. In some embodiments, visualization processor 232 may render various analytics to represent the concept terms including, but not limited to, images, charts, tables, dashboards, maps, and the like. In some embodiments, visualization processor 232 may present the expanded list of concept terms or candidate answers to the user.

In some embodiments, feedback handler 234 may be a computer module that processes feedback from users on expanded concept terms generated by concept expander 228 or other users (e.g., the feedback handler 234 implements training data). In some embodiments, users may generate data for use by the NLP system 212 in order to determine which concept terms are valid (e.g., as provided via the gaming modules 136 and 138). For example, and as described in more detail below, a user on a remote device may be prompted to generate one or more concept terms that are conceptually related with a first identified seed concept term using a plurality of individual characters. A gaming module (e.g., gaming module 140) may then obtain the list of the set of concept terms generated by the user and determine whether each of the concept terms are valid such that they will be included in the corpora, as described in more detail below. The feedback handler 234 may then upload each of the valid words to the corpora.

Figure 3:
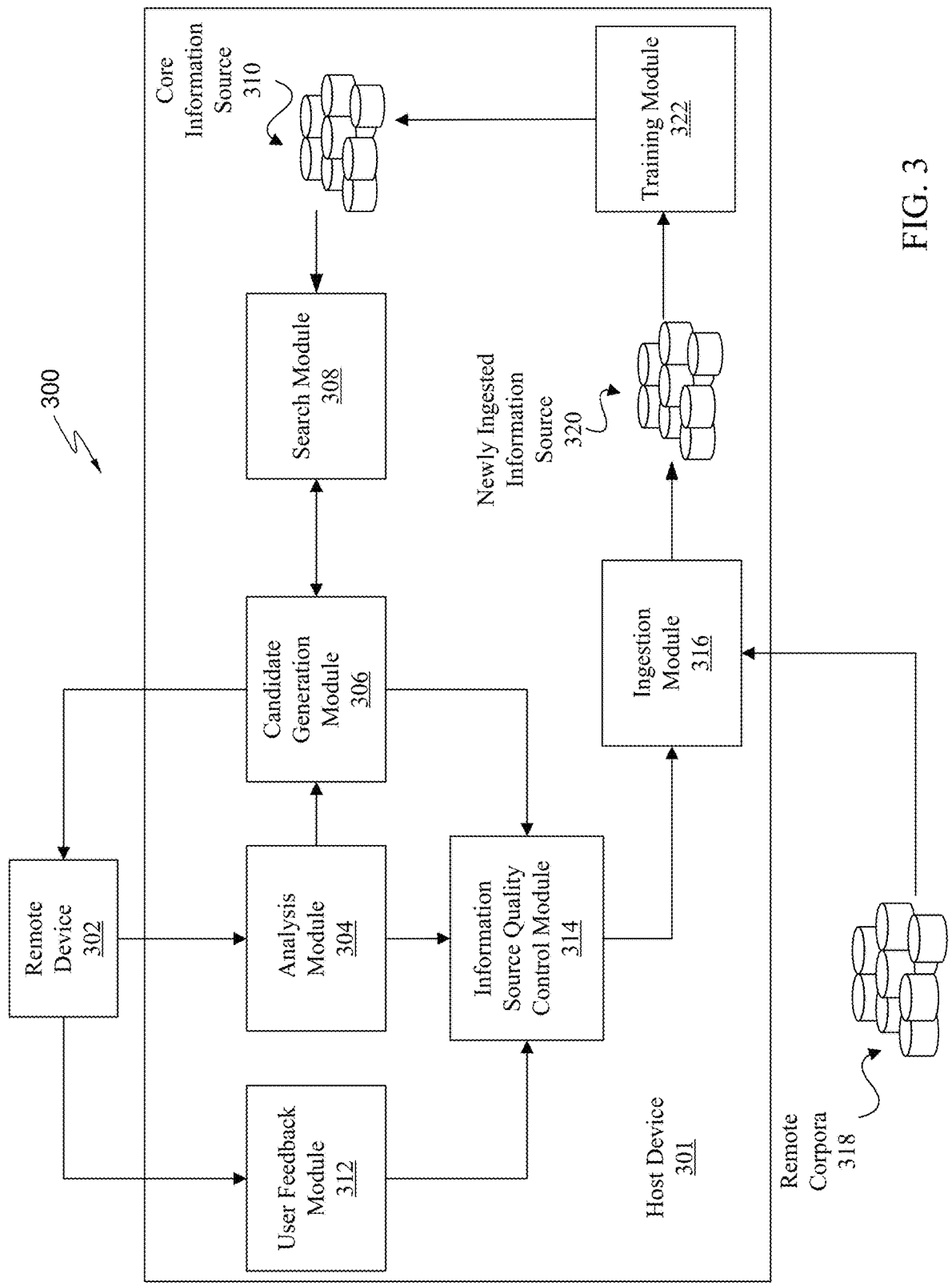
FIG. 3 illustrates a block diagram of an example high level logical architecture of a cognitive computing system, consistent with embodiments the present disclosure.

FIG. 3 illustrates a block diagram of an example high level logical architecture of a cognitive computing system, consistent with embodiments of the present disclosure. Aspects of FIG. 3 are directed toward components and modules for use with a cognitive computing system. In some embodiments, host device 301 and remote device 302 may be embodied by host device 122 and remote device 102 of FIG. 1, respectively. In some embodiments, the analysis module 304, located on host device 301, may receive a natural language seed concept term from a remote device 302, and can analyze the seed concept term to produce information about the seed concept term (e.g., provide expanded list of candidate concept terms). This may be accomplished, for example, by using components 216, 218, 220, 222, and 240 of FIG. 2. The information produced by analysis module 304 may include, for example, the semantic class of the seed concept term.

Next, the candidate generation module 306 may formulate queries (e.g., seed concept terms) from the output of the analysis module 304 and then pass these queries on to search module 308 which may consult various resources (e.g., social media portals, blogs, books, studies, etc.) to retrieve documents that are relevant for providing a the list of expanded candidate concept terms. As used herein, documents may refer to various types of written, printed, or electronic media (including passages, web-pages, database files, multimedia, etc.) that provide information or evidence. As illustrated in FIG. 3, the search module 308 may consult core information source 310. As used herein, a core information source may refer to any document or group of documents that is used by a relevant cognitive computing system to generate expanded concept terms or generate candidate answers to user questions. The candidate generation module 306 may extract, from the search results obtained by search module 308, candidate expanded concept terms, which it may then score (e.g., with confidence scores) and rank. A final list of expanded concept terms, based on a comparison of various confidence scores associated with the expanded concept terms, may then be sent from the candidate generation module 306 to remote device 302 for presentation to the user. In addition, this information about expanded concept terms and confidence scores may also be sent to information source quality control module 314. A user may respond, via remote device 302, to generate conceptually related concept terms of a seed concept term (for example, the remote device 302 may receive user-generated expanded concept terms and upload the user-generated concept terms to the cognitive computing system via a gaming module, as described below) through user feedback module 312. The user feedback module 312 may then provide this feedback to the information source quality control module 314.

In some embodiments, the information source quality control module 314 may compile and analyze information that it receives during the course of normal operations of cognitive computing system 300. This received information (e.g., information from analysis module 304, candidate generation module 306, and user feedback module 312) may be usable by the information source quality control module 314 to determine whether one or more new information sources should be ingested. When the information source quality control module 314 determines that a new information source having certain characteristics is needed (e.g., an information source that is associated with a specific user-generated concept term), it may instruct an ingestion module 316 accordingly. Based on these instructions, ingestion module 316 may search one or more remote sources, such as remote corpora 318, in an attempt to locate one or more suitable new information sources. In some embodiments, once discovered, these new information sources may be ingested by ingestion module 316 and become newly ingested information source 320. This information source may in turn be analyzed by training module 322. This training analysis may take the form of training potential expanded concept terms using the newly ingested information source 320 and then reviewing the quality of the corresponding expanded concept terms. In some embodiments, once a threshold level of confidence in the new information source is met, it may be combined with core information source 310 and used to generate expanded concept terms as users input seed concept terms.

The various components and modules of the exemplary high level logical architecture for a cognitive computing system described above may be used to implement various aspects of the present disclosure. For example, the analysis module 304 may, in some embodiments, be used to receive a set of seed concepts from a user. The candidate generation module 306 and search module 308 may together, in some embodiments, be used to perform searches of core information source 310, generate expanded concept terms, calculate confidence scores associated with the expanded concept terms, and provide the expanded concept terms to one or more users. Further, the information source quality control module 314 may, in some embodiments, be used to analyze confidence scores and determine whether the confidence scores fail to meet one or more confidence criteria. Further, ingestion module 316 may, in some embodiments, be used to ingest new information sources (in response to an indication from the information source quality control module 314 that a confidence criteria has not been satisfied).

Figure 4:
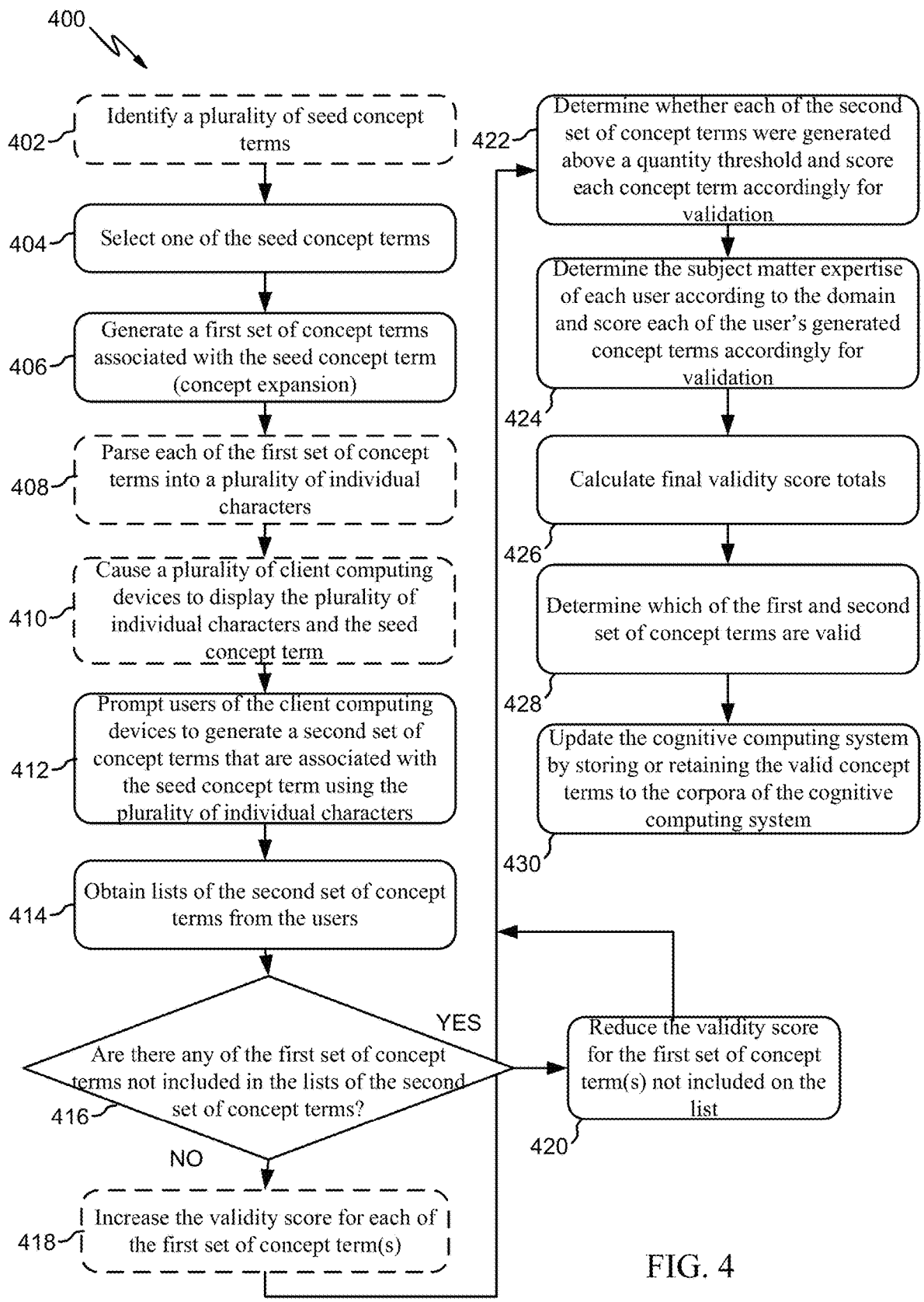
FIG. 4 is a flow diagram of an example process for training a cognitive computing system based on obtaining user-generated expanded concept terms for particular seed concept terms.

FIG. 4 is a flow diagram of an example process 400 for training a cognitive computing system based on obtaining user-generated expanded concept terms for particular seed concept terms. It is to be understood that the order in which the blocks described below are discussed is not to be construed as limiting the order in which the individual acts may be performed. In particular, the acts performed may be performed simultaneously or in a different order than that discussed.

In some embodiments, the process 400 may begin at block 402 when the cognitive computing system identifies a plurality of seed concept terms. In some embodiments, the cognitive computing system may only identify a single seed concept term. In other embodiments, a SME or other user may identify the seed concept terms. In an example illustration, the cognitive computing system may first identify a domain it will train in, such as orthopedic medicine. The cognitive computing system may then identify and select from its corpora (e.g., medical transcriptions data stores) a set of seed concept terms within the orthopedic medicine domain. For example, the cognitive computing system may identify and select the seed concept terms of inversion (type of body movement), arthroplasty (surgical procedure), spinal fusion (surgical procedure), and lordosis (inward curvature of spine).

Per block 404, the cognitive computing system may then select one of the seed concept terms as the first seed concept term. For example, using the illustration above, "inversion" may be selected. Per block 406, the cognitive computing system may then generate a first set of expanded concept terms that are candidates for being conceptually related to the first seed concept term. To generate one or more concept terms that are "conceptually related" with seed concept terms means that concept terms and seed concept terms may be related by way of being synonyms, hypenyms, holonyms, hyponyms, merronyms, coordinate terms, verb particles, troponyms, entailments, or by having any other association. For example, using the illustration above, if "inversion" (inward movement of a foot) was selected as the seed concept term to run concept expansion on, the cognitive computing system may then access from its corpora (e.g., information corpus 226 of FIG. 2) synonyms of inversion (e.g., utilizing the analyzer 214 of FIG. 2) and provide the expanded concept terms of: internal rotation (inward movement of arm/hip), abduction (outward movement of hip/arm), radial deviation (side movement of thumb towards wrist), and sacrum (triangular bone at end of external spine that experiences little or no movement).

In some embodiments, per block 408, a server computing device (e.g., cognitive computing system) or client computing device may parse each of the first set of concept terms into a plurality of individual characters (e.g., via the gaming module 140 of FIG. 1). For example, using the illustration above, the cognitive computing system may split internal rotation, abduction, radial deviation, and sacrum all into individual letters. The server computing device may shuffle or reorganize the plurality of individual characters prior to block 410 in order to conceal the words such that the user may find or generate the concept terms individually on his or her own or even generate new concept terms, as described in more detail below. In some embodiments, the cognitive computing system may generate the first set of concept terms (block 406) and thereafter cause various client computing devices to display a plurality of individual characters without parsing the first set of concept terms into its letters. Rather, the cognitive computing system may provide a random generated set of letters to a client computing device in block 410. In some embodiments, a client computing device or other server computing system may be the entity that performs block 408 instead of the cognitive computing system. In some embodiments, the cognitive computing system or server computing device may provide the first set of concept terms to the client computing device and the client computing device performs block 408.

In some embodiments, per block 410, the server computing device may provide the plurality of individual characters and the seed concept term to users (e.g., by causing the individual characters and seed concept term to be displayed by the plurality of client computing devices, by providing characters and seed concept term by audio, etc.). In embodiments, the plurality of client computing devices may display the individual characters and the seed concept term without the cognitive computing system or server computing device input (e.g., via the gaming module 136), as the client computing devices may be the entities that identify the selected seed concept term and provide the plurality of individual characters and the seed concept term. In some embodiments, block 410 may be a result of a service that has first solicited user concept expansion as a free and downloadable game in order to recruit as many participants as possible to generate concept terms from the plurality of individual characters, as described in more detail below. As described above, a potential advantage of soliciting the downloadable game across the web is the idea of crowdsourcing to employ several people from different perspectives and reducing resource costs (e.g., SME workload) to choose which expanded concept terms or candidate expanded terms initially generated by the cognitive computing systems are valid.

Per block 412, and in some embodiments, the plurality of client computing devices (or server computing device(s)) may prompt users of the plurality of computing devices to generate a second set of concept terms that are conceptually related to the seed concept term by using the plurality of individual characters. Each user may therefore generate a second set of concept terms. Block 412 may correspond to the game that is solicited to help train the cognitive computing system. For example, the game may be a word search game, wherein the user views the seed concept term and tries to generate (e.g., come up with or create) words that are related to the seed concept term. The layout, embodiments, and GUI of the game are described in more detail below. Using the example above, the plurality of client computing devices (or server computing device(s)) may prompt each user to generate their own second set of concept terms that are conceptually related to the seed concept term of "inversion" by using each of the shuffled letters as found in the expanded concept terms of internal rotation, abduction, radial deviation, and sacrum.

Per block 414, the plurality of client computing devices (or server computing device(s)) may obtain respective lists (e.g., a compilation of concept terms) of the second set of concept terms from the plurality of users. In some embodiments, each of the users' lists are transmitted from a corresponding client computing device to the cognitive computing system (or other server computing device) for analysis. Alternatively, each client computing device may obtain the list and perform its own analysis (e.g., via the gaming module 136 of FIG. 1). Using the illustration above, after viewing the seed concept term of "inversion" a first user, who is an orthopedic surgeon, may generate from the individual characters the second concept terms of abduction, adduction (inward movement of hip/arm), internal rotation, external rotation (rotational outward movement of hip/arm), eversion (outward movement of foot), radial deviation, dorsiflexion (upward movement of foot), plantar flexion (downward movement of foot), and supination (type of inward foot movement). The orthopedic surgeon's list may then be transmitted to the cognitive computing system or be retained by the orthopedic surgeon's computing device for analysis.

Per block 416, the server computing device (e.g., cognitive computing system) may then determine (e.g., via the gaming module 140 of FIG. 1) if any of the first set of concept terms (that were generated by the cognitive computing system per block 406) are not included within any of the lists of the second set of concept terms (generated by the plurality of users). Accordingly, the server computing device may compare the second sets of concept terms with the first set of concept terms to determine if there is a match. Per block 420, if there are one or more of the first concept terms that are not included on the lists of the second concept terms, then the server computing device may further reduce a validity score for the one of the first set of concept terms based on the determining that the one or more of the first set of concept terms are not included on the list.

Invalidation, validation, validity, invalidity, etc. correspond to what concept terms the cognitive computing system will utilize or not utilize for future concept expansion sessions or other analyses. These terms may further correspond to determining a probability that an expanded concept term is correct in view the seed concept term. Using the example illustration above, if none of the users generated the concept term of "sacrum," then the validity score for sacrum may be reduced such that "sacrum" may not be utilized for future concept expansion sessions for the seed concept term "inversion". Validity Score, validity scoring, etc. as described herein may mean to increase or decrease a value for, weight a value for, lower or increase the value of, change a ranking of, etc. of a particular concept term either generated by a user or the cognitive computing system towards or away from validity. For example, the concept term sacrum may start with a validity score of 100 and decrease to a validity score of 60, for final validity score calculation purposes as described in more detail below.

Per block 418, if all of the first set of concept terms are included in the list of the second set of concept terms (e.g., there is a match), then the server computing device (or client computing device) may increase the validity score for each of the first set of concept terms. In some embodiments, block 418 may not be performed. Accordingly, block 416 may only be utilized to reduce a validity score per block 420.

Per block 422, the server computing device may determine (e.g., via the gaming module 140 of FIG. 1) whether each term of the second sets of concept terms was generated by the plurality of users above a quantity threshold. The cognitive computing system may then score each of the second set of concept terms accordingly for validation purposes. In some embodiments, the "quantity threshold" may correspond to a quantity frequency or percentage (static or dynamic) at which the generation of the concept terms are acceptable for validation purposes. For example, using the illustration above, if the concept term "abduction" was generated by 90% of the users (e.g., the static quantity threshold for validation may be 85%), then the server computing device may score "abduction" towards validity (e.g., increase a validity score). Alternatively, if the concept term abduction was generated over 50 times total by the plurality of users (e.g., the static quantity threshold may be a raw number of 20), then abduction may also be scored towards validity.

In some embodiments, the quantity threshold may be dynamic such that the cognitive computing system does not store a predetermined threshold quantity requirement value but rather scores for validation a particular quantity of concept terms regardless of how frequently they were generated. For example, using the illustration above, because the seed concept term "inversion" may be a domain-specific term, many people might not understand the seed concept term in its proper context or domain of orthopedic medicine. Accordingly, for example, if there was not one single expanded concept term that was generated by more than 5% of users, then the cognitive computing system may take this into account and only retain for validation those concept terms that have been generated the most (e.g., retain the term that was generated by 5% of the users) because most people would not understand a particular concept term.

Per block 424, the server computing device (or a plurality of client computing devices) may determine the subject matter expertise of each user according to the domain and weigh each of the user's generated concept terms accordingly for validation. In these embodiments, a domain may first be identified that is associated with the seed concept term (e.g., orthopedic medicine). The server computing device (or client computing device) may then identify a subject matter expertise of each user. For example, the client computing devices may require or ask users before they play the concept term game to input their names, occupations, skills, knowledge, and/or know-how to identify a subject matter expertise of each user (which may be transmitted and stored to the user information database 134 of FIG. 1). The server computing device (or client computing device) may then compare the subject matter expertise of various users with the domain. The server computing device (or client computing device) may then provide a score, based on the comparing, for validation purposes. For example, using the illustration above, the orthopedic surgeon's list of concept terms (abduction, adduction, internal rotation, external rotation, eversion, radial deviation, dorsiflexion, plantar flexion, and supination) may each be scored higher (or weighed more strongly), as opposed to a list generated by a computer technician who may not be as familiar with the domain of orthopedic medicine. Therefore, concept terms may be more likely to be utilized by the cognitive computing system or be valid if the person who generates the concept terms are familiar with the domain. In some embodiments, a domain may be identified and associated with a particular category, as opposed to a seed concept terms. Particular categories are described in more detail below.

Per block 426, the server computing device may calculate final validity score totals to determine which of the second set of concept terms are valid (e.g., via the gaming module 140 of FIG. 1). In some embodiments, final validity score totals may be calculated by adding each of the individual validity scores obtained from block 416, 422, and 424. In some embodiments, more or less scores may be provided as illustrated in FIG. 4 for validity score totals. In some embodiments, final validity score calculations may be static (e.g., simply adding each individual validity score). In other embodiments, calculations may be dynamic (e.g., determining that the subject matter expertise (block 424) of the orthopedic surgeon weighted or scored higher than any other score evaluations given the domain-specific seed concept term of "inversion"). In an example of a static final validity score calculation, using the illustration above for the concept term of "internal rotation," the score, per block 418, may increase towards validation since internal rotation may have been included in the first set of concept terms (e.g., may increase by 5 points). Per block 422, internal rotation may have been the highest generated concept term (e.g., over 80% of users generated the term), which may cause the validity score for "internal rotation" to increase by 15 points. Per block 424, each of the users who were deemed to have appropriate subject matter expertise according to the domain (e.g., physical therapists, orthopedic surgeons, chiropractors, etc.) may have generated the term internal rotation, which may cause a validity score increase of 20 points for that term. The server computing device (e.g., via the gaming module 140 of FIG. 1) may then add up each score (5+15+20) to arrive at a final validity score of 40.

Per block 428, the server computing device may then determine which of the first and second set of concept terms are valid. In some embodiments, a rank of the concept terms may be determined according to the validity scores instead of determining validity. For example, the concept terms of "abduction" may have the highest validity score and therefore rank the highest (e.g., the cognitive computing system will provide "abduction" as an expanded concept term of the seed term "inversion" with a high confidence interval or first on a list for future runs). In some embodiments, a concept term may only be valid if it is over a threshold validation score total. For example, each concept term that has a total score over 50 may be determined to be valid.

Per block 430, the cognitive computing system may then be updated by storing or retaining the valid concept terms to the corpora of the cognitive computing system. In some embodiments, only the valid concept terms are used by the cognitive computing system. In other embodiments, all of the concept terms are utilized by the cognitive computing system but in a ranked fashion according to the validity score. Using the illustration above, the server computing device may determine that the concept terms of abduction, adduction, internal rotation, external rotation, eversion, radial deviation, dorsiflexion, plantar flexion, and supination are all valid concept terms. Consequently, a server computing device may transmit a list of the concept terms that are valid to the cognitive computing system. In some embodiments, the cognitive computing system is the server computing device and therefore does not have to transmit the list. The cognitive computing system may then identify and store (e.g., via the feedback handler 234 of FIG. 2) the list to its corpora for future concept expansion runs. For example, using the illustration above, if utilizing a concept expansion service, a user typed in the concept seed term of "inversion," the cognitive computing system may provide the updated list of expanded concept terms—abduction, adduction, internal rotation, external rotation, eversion, radial deviation, dorsiflexion, plantar flexion, and supination—as opposed to the original list of concept terms provided in block 406—internal rotation, abduction, and radial deviation. Therefore, the cognitive computing system may be efficiently trained by providing the game to multiple users and scoring accordingly.

Figure 5:
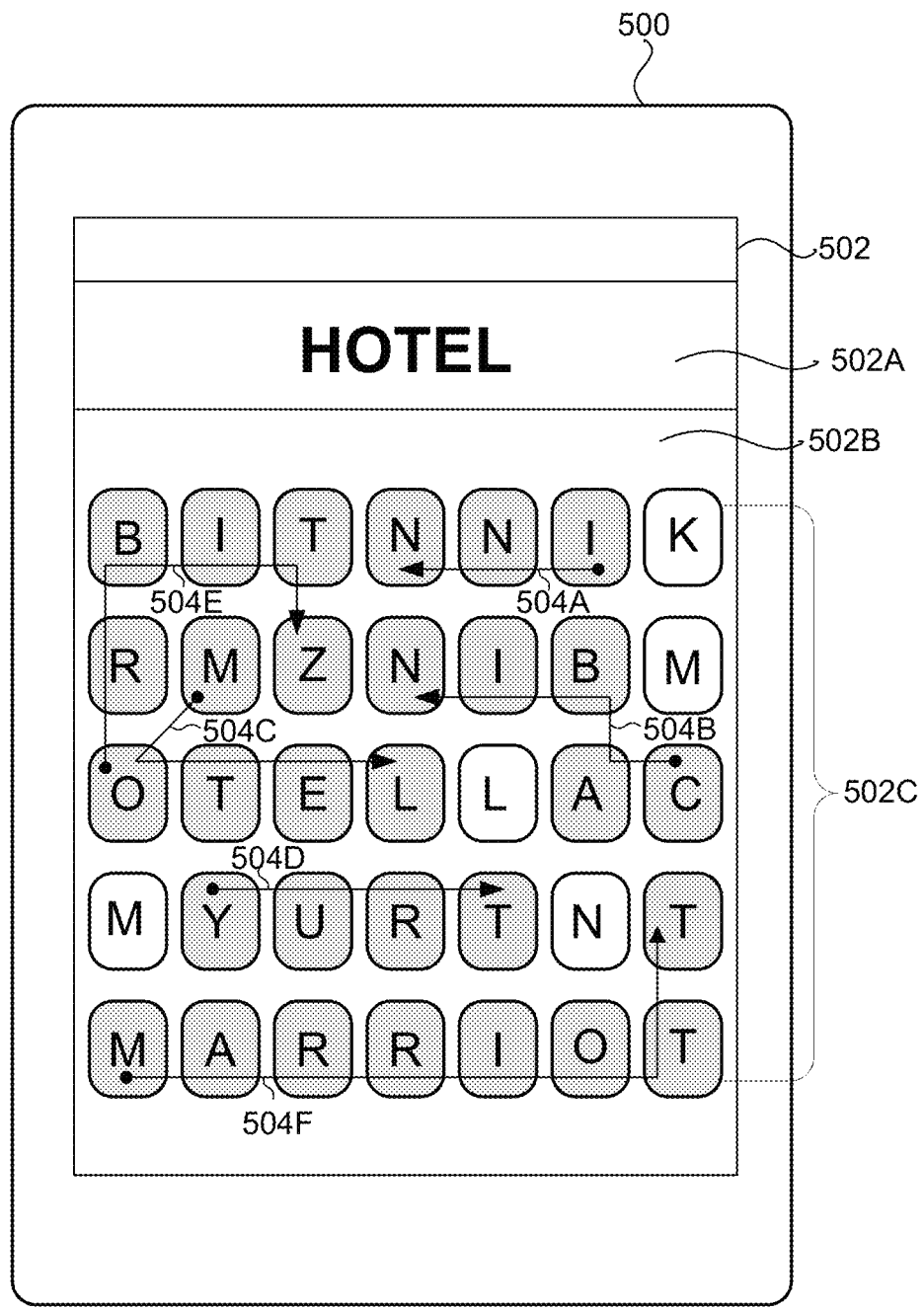
FIG. 5 is a diagram of an example client computing device game GUI that includes a seed concept term and individual characters for use in generating expanded concept terms of the seed concept term, according to embodiments.

FIG. 5 is a diagram of an example client computing device game GUI that includes a seed concept term and individual characters for use in generating expanded concept terms of the seed concept term, according to embodiments. FIG. 5 includes a client computing device 500 (which may also be the remote devices 102 or 112 of FIG. 1), a GUI 502, which includes a header 502A that contains the seed concept term "hotel," a background 502B, and a plurality of individual characters 502C. In some embodiments, the GUI may be displayed via the gaming modules 136 and/or 138 of FIG. 1. Consistent with embodiments, the plurality of individual characters 502C may include a two-dimensional array of cells (blocks) and each cell may include a letter. In some embodiments, the one or more concept terms may be generated by connecting one or more of the respective cells. For example, in some embodiments, 504A, 504B, 504C, 504D, 504F, and 504E as represented by the arrows may each correspond to finger gestures on a touch surface (e.g., touch pad, mobile phone, etc.) such that a user generates the expanded concept terms using the gestures by connecting one or more of the individual characters 502C. In some embodiments, 504A, 504B, 504C, 504D, 504E, and 504F represent pointer movements or field sequences on a desktop computer or other device to generate expanded concept terms by connecting one or more of the individual characters 502C.

As illustrated in FIG. 5, the client computing device 500 may display the seed concept term of "hotel" within the header 502A. A user may be prompted to generate one or more concept terms that are associated with the seed concept term of "hotel" using the one or more of the plurality of individual characters 502C, such as performing a word search for words conceptually related with the word "hotel". As illustrated in FIG. 5, the user may accordingly generate a list of four seed concept terms. For example, using the gesture 504A, the user may generate the concept term of "inn." Using the gesture 504B, the user may generate the concept term of "cabin." Using the gesture 504C, the user may generate the concept term of "motel." Using the gesture 504D, the user may generate the concept term of "yurt." Using the gesture 504E, the user may generate the concept term of "ORBITZ." Using the gesture 504F, the user may generate the concept term of "MARRIOTT." These concept terms may all be conceptually related (or be candidates for being conceptually related) with the seed concept term of "hotel."

In some embodiments, the background 502B portion of the GUI 502 may display a pictorial representation of a domain to a user. The domain may be for use in providing a context for the seed concept term (or particular category). Using the illustration of FIG. 5, for example, the background 502B may include a faint picture of a set of hotels, buildings, etc. This may help a user determine what context and field of knowledge a particular seed concept term belongs to. In another example, if the seed concept term was "trunk," the background 502B may include a picture of a tree in the background, as opposed to a car, to indicate that the user should be generating concept terms based on a tree trunk instead of a car trunk. In some embodiments, the background 502B may include the areas just below and above the header 502A and the areas in between the cells of the individual characters 502C. In some embodiments, the server computing device may cause the client computing device 500 to display the pictorial representation.

In some embodiments, the seed concept term may be displayed within a sentence to the client computing device 500 to indicate a domain or particular category to which a particular concept terms belongs to. The sentence may be displayed instead of or in addition to the pictorial representation of the domain described above. Using the illustration above, for example, a header of the GUI may include the sentence "Tree trunks include bark," with "tree trunk," highlighted so as to indicate which words or phrases of the sentence are the seed concept terms. This sentence may indicate the user should be generating concept terms based on a tree trunk instead of a car trunk. In some embodiments, the server computing device may cause the client computing device 500 to display the sentence.

In some embodiments, each user may earn a particular amount of points for generating each concept term and may accordingly accumulate a game score or point total earned at the end of a specified amount of time (e.g., 5 minutes). In some embodiments, as each user reaches a point threshold, the client computing device (or cognitive computing system) may provide additional characters (e.g., unlock new characters) such that a user can try to generate new concept terms. This may be for use in providing an incentive to generate as many concept terms as possible. Other incentive mechanisms may include providing or displaying a ranking based on individual game scores such that a user may identify how well he or she performed when compared with other users. Further, the game may include a single player or multiple player mode such that each user may choose how many users he or she will compete against.

Figure 6:
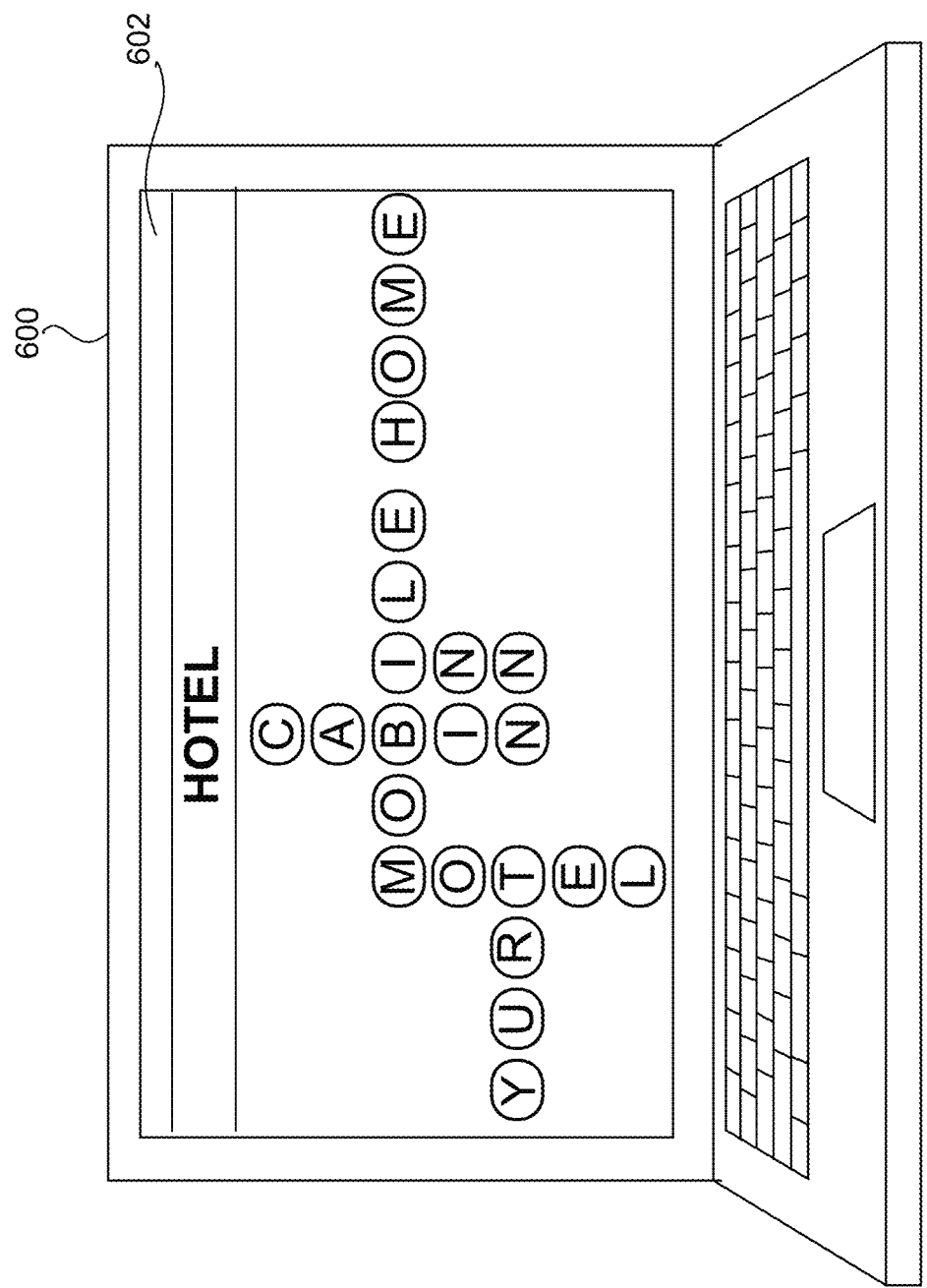
FIG. 6 is a diagram of an example client computing device game GUI that includes a seed concept term and individual characters for use in generating expanded concept terms of the seed concept term, according to embodiments.

FIG. 6 is a diagram of an example client computing device game GUI that includes a seed concept term and individual characters for use in generating expanded concept terms of the seed concept term, according to embodiments. FIG. 6 includes a computing device 600 and a GUI 602. The GUI 602 includes the seed concept term of "hotel" and the various expanded concept terms of "mobile home," "yurt," "motel," "cabin," and "inn." The GUI 602 may be provide via the gaming module 136 and/or 138 of FIG. 1.

FIG. 6 illustrates that the game GUI 602 may not necessarily be a word search game, but include other formats or rules such as the user may build their own words from individual characters. Accordingly, the game format may not include a predefined array of individual characters that the user must use to search for words (e.g., FIG. 5), but may include, for example, the seed word concept only and the user has to try and make a list of all of the concept terms associated with the seed word concept. In some embodiments, at least one character may be displayed such that a user may build his or her own words from the character. For example, using the illustration of FIG. 6, initially the GUI 602 may only include the seed concept term of "hotel," and the letter "M" (or a first concept term—e.g., mobile home). From the letter M, the user may first generate the concept term of "mobile home" in a horizontal plane. Using the letter M, the user may also generate a concept term of "motel" in a vertical plane. Using the letter "B" within "mobile home," the user may generate the seed term "cabin." Using the letter "I" in mobile home, the user may generate the concept term of "inn." Using the concept term of "motel," the user may generate the concept term of "yurt." The game GUI may be any suitable game format for generating various expanded concept terms for given seed concept terms.

Figure 7:
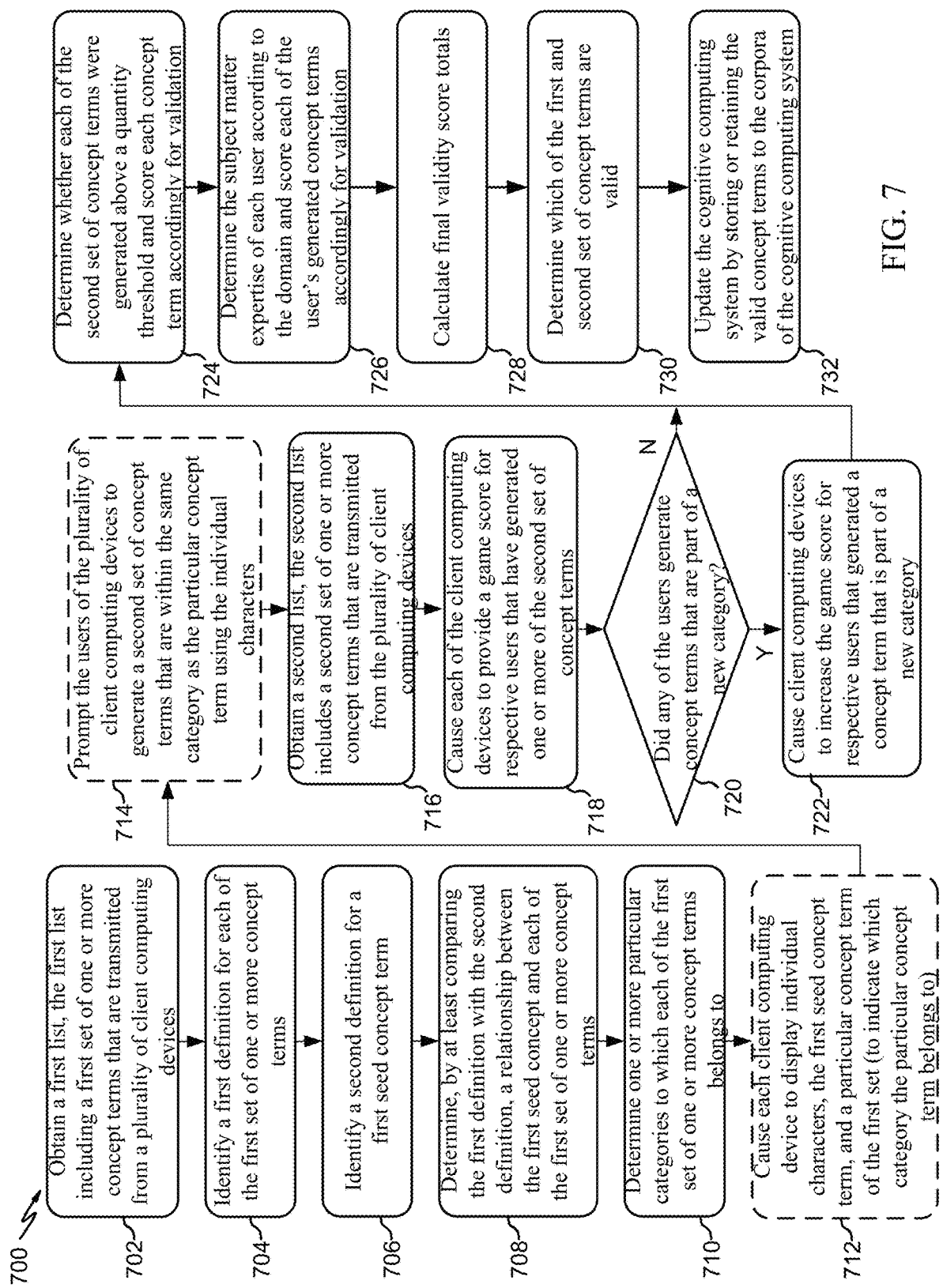
FIG. 7 is a flow diagram of an example process for categorizing a first set of user-generated concept terms and prompting each user to generate a second set of concept terms that are within the same category as the one or more the first concept terms, according to embodiments.

FIG. 7 is a flow diagram of an example process 700 for categorizing a first set of user-generated concept terms and prompting each user to generate a second set of concept terms that are within the same category as the one or more the first concept terms, according to embodiments. In some embodiments, the process 700 may begin at block 702 when the cognitive computing system obtains a first list. The first list may include a first set of one or more concept terms that a plurality of users generated. The first set of one or more concept terms may be transmitted from a plurality of client computing devices to the cognitive computing system (or server). In some embodiments, block 702 may be block 414 as specified in FIG. 4. Accordingly, prior to block 702, the cognitive computing system may have first generated its own set of concept terms that are candidates for being conceptually related to a seed concept term in some embodiments.

Further, prior to block 702, the plurality of client computing devices may provide (e.g., display) a plurality of individual characters and a seed concept term to a plurality of users using the respective plurality of client computing devices. The plurality of client computing devices may prompt the plurality of respective users of the plurality of client computing devices to generate the firsts set of one or more concept terms that are conceptually related to the seed concept term using one or more of the plurality of individual characters. Block 702 may therefore be in response to the prompting of the plurality of respective users to generate the first set of one or more concept terms that are conceptually related to the seed concept term. Although the process 700 is illustrated as including a plurality of client computing devices and a plurality of respective users of the plurality of client computing devices, it is understood that the process 700 may instead correspond to only one user that utilizes only one client computing device.

Per block 704, the cognitive computing system may identify a first definition (e.g., via the POS tagger 218 of FIG. 2) for each of the first set of one or more concept terms. A "definition" as described herein may refer to a meaning of a particular concept term and/or seed concept term. The definition may be derived from any suitable source such as a dictionary, thesaurus, book, article, etc. within a data store (e.g., Information Corpus 226 of FIG. 2). The definition may include a part of speech. A "part of speech" may describe a word type of a word depending on the word's syntactic use or function in a sentence (e.g., noun, adjective, pronoun, verb, adverb, preposition, conjunction, interjection, article, etc.). In an example illustration, a user may generate the concept term of "MARRIOTT" and the cognitive computing system may receive the concept term MARRIOTT and look up the definition in a dictionary. The definition may read "the business and name of place of lodging for a fee." The dictionary may include a part of speech associated with the definition of MARRIOTT, which may be "noun." In some embodiments, a set of concept terms may include multiple definitions and may therefore include different parts of speech. Accordingly, in some embodiments, the cognitive computing system may select a particular definition for a concept term based on ranking or scoring the different definitions according to secondary factors. Such secondary factors may include but are not limited to a particular domain that the set of concept terms belong to, comparing multiple concept terms together that a particular user has generated, etc. For example, for the concept term of "trunk," the definition may correspond to a portion of a car or portion of a tree but if the domain is associated with a tree then the definition would be the portion of the tree. Therefore, the cognitive computing system may score the definition associated with a tree higher for definition purposes.

In some embodiments, the cognitive computing system may utilize an ontology (e.g., via the POS tagger 218) for a particular concept term instead of or in addition to identifying a definition for that particular concept term. An "ontology" may be a particular conceptualization of a symbol (e.g., phrase, acronym, etc.) in an information system. Accordingly, an ontology may describe what a symbol represents as opposed to what a symbol means such that an entity may understand the definition by a well-described or understood symbol. Ontologies may include one or more axioms (i.e., a rule or statement that people generally regard as true) to better reflect a meaning of a symbol. The cognitive computing system may utilize ontologies by mapping a particular concept term to a symbol. For example, a symbol may be the word "Big Apple," and particular concept terms that may be mapped to "Big Apple" are "large apples," and/or "New York City." The cognitive computing system may determine the ontology associations via various data sources within an information corpus such as social media, newspaper articles, etc. that have associated the concept terms with "Big Apple."

Per block 706, the cognitive computing system may identify a second definition (e.g., via the POS tagger 218) for a first seed concept term. For example using the illustration above, the seed concept term for the concept term of MARRIOTT may be hotel. The definition of hotel may be "a type of place of lodging for a fee."

Per block 708, the cognitive computing system may determine (e.g., via the POS tagger), by at least comparing the first definition with the second definition, a relationship between the first seed concept term and each of the first set of one or more concept terms. Determining a "relationship" between the first seed concept term and each of the first set of concept terms may include comparing words, phrases, and/or parts of speech of the first and second definitions to determine how similar or different the first seed concept term is from the first set of one or more concept terms. Determining a relationship may also include comparing passages (e.g., within the information corpus 1226 of FIG. 2) that the first seed concept term and each of the first concept terms are found in. "Passages" may be part of an information source (e.g., social media post) that may provide a context for what a particular seed concept term or concept term means or is associated with. For example, the seed concept term of "hotel" may be selected from a blog within an information corpus in which someone stated in a passage: "hotels are the worst places to stay at." The passage may therefore include the corresponding sentence to which the seed concept term "hotel" belongs to. In some embodiments, ontologies may further be compared. In some embodiments, each of the first set of one or more concept terms may also be compared to each other in addition to comparing them with the first seed concept term.

Utilizing the example illustration above, the first definition for MARRIOTT "the business and name of place of lodging for a fee," and the second definition for hotel "a type of place of lodging for a fee" may be compared. The cognitive computing system may, for example, identify that MARRIOTT is a "name of a place of lodging . . . " whereas "hotel" is "a type of place of lodging . . . " which may be utilized to categorize each concept term, as described in more detail below.

Per block 710, the cognitive computing system may select or determine one or more particular categories to which each of the first set of one or more concept terms belongs to based on at least the determining of the relationship. A "category" or "subordinate category" as described herein may be a distinct class that a particular set of concept terms belongs to (which may be narrower than a domain or semantic class). For example, a domain may be "medicine" and a seed concept term may be "orthopedic surgery." The seed concept term may be placed in the category of "orthopedics," which is narrower than the domain of medicine. A category of various concept terms may have one or more common characteristics. For example, for the category of "orthopedics," concept terms of "multiple sclerosis," "angioplasty," and "total knee replacement," have common characteristics in that each concept term either refers to a musculoskeletal deformity or a correction of a musculoskeletal deformity. A category may also include an identification (e.g., orthopedics) that describes a specific meaning (or is a symbol that represents) for a particular set of concept terms.

In an example of block 710 using the illustration above, because MARRIOTT is a "name of a place of lodging . . . " whereas "hotel" is "a type of place of lodging . . . " the cognitive computing system may consequently generate or place the seed concept term of "hotel" in the category of "type of lodging," whereas the concept term of MARRIOTT may be placed in the category of "name of lodging."

Per block 712, and in some embodiments, the cognitive computing system may cause each of the plurality of client computing devices to display a plurality of individual characters, the first seed concept term, and a particular concept term of the first set of one or more concept terms (e.g., FIG. 8) in order to indicate or hint at which category the particular concept term belongs to. For example, if a client computing device displayed a seed concept term of "car," and a generated concept term of "HONDA," then it may be implicit that the user must generate concept terms that are car manufacturers (e.g., TOYOTA, FORD, etc.). Alternatively, in some embodiments, the cognitive computing system may cause the plurality of client computing devices to each explicitly display a category that the particular concept term belongs to. For example, a GUI of each client computing device may explicitly display the plurality of individual characters, the particular concept term and the category to which the concept term belongs to.

Figure 8:
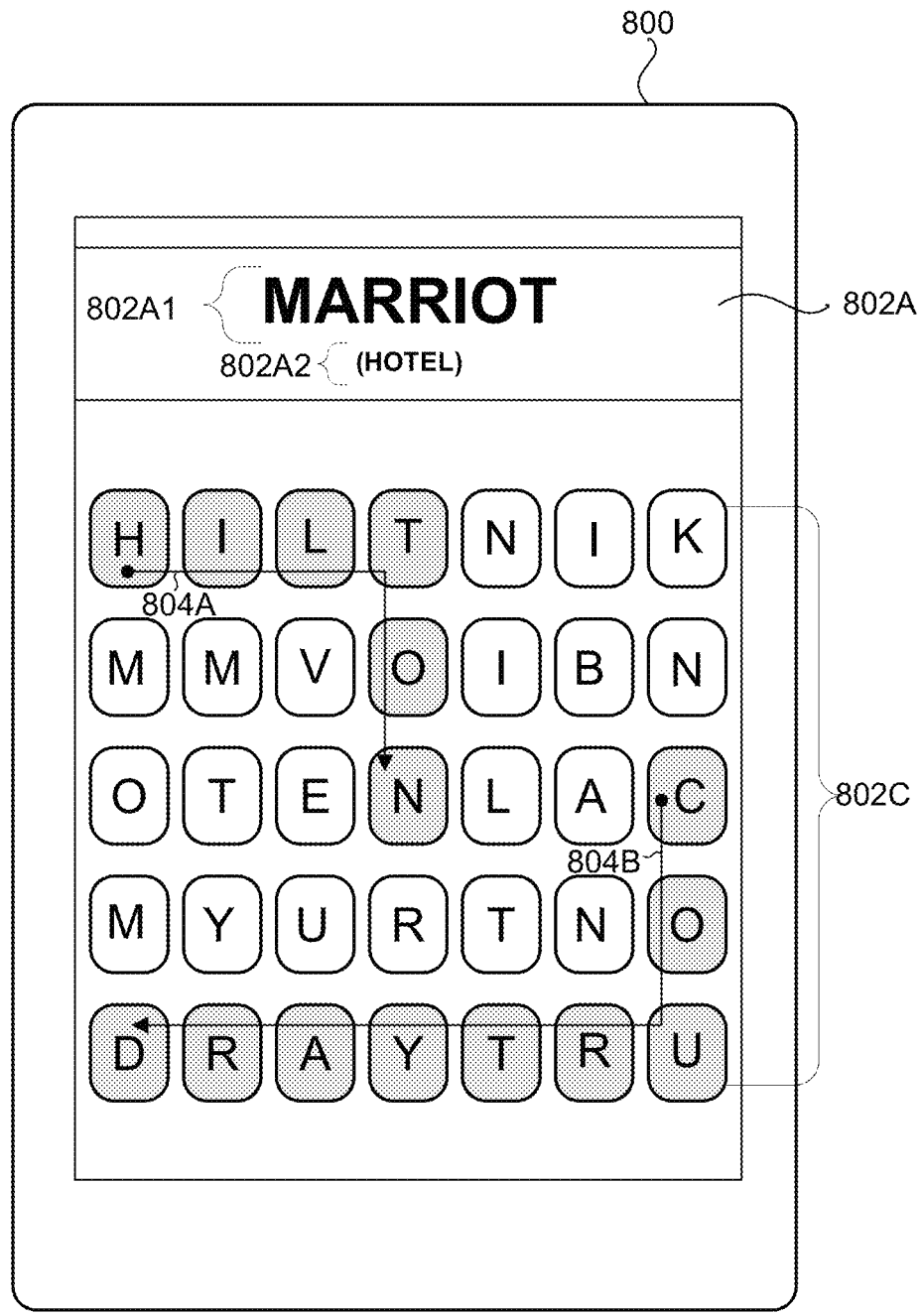
FIG. 8 is a diagram of an example client computing device game GUI that includes a user-generated concept term and individual characters for use in generating expanded concept terms of the user-generated concept term, according to embodiments.

In some embodiments, block 712 may be in response to the cognitive computing system causing each of the plurality of client computing devices to display the one or more particular categories to which the first set of one or more concept terms belongs that each user generated. Each of the client computing devices may then receive a request for a particular concept term that belongs to a category. For example, a GUI of a client computing device may display each category and under each category each of the concept terms in which a particular user generated may be listed under each category such that it is evident what particular category each generated concept term belongs to. The client computing device may then prompt (e.g., notify via a message) the respective user to select one of the first set of one or more concept terms (in order to generate a second set of one or more concept terms that are within the same category as one of the first set of one or more concept terms, as described in more detail below). The client computing device may then receive a user request for the particular concept term and the client computing device may then, in response the receiving of the request, display the plurality of individual characters and the particular concept term (e.g., as illustrated in FIG. 8).

In some embodiments, each of the client computing devices may display a notification that specifies or instructs that the user must generate concept terms that are within the same category as the particular concept terms in order to earn points. After the notification, then only the particular concept term may be displayed along with the individual characters (e.g., without the seed concept term or the category to which the particular concept term belongs to). Although embodiments herein are described as "displaying" a plurality of characters, concept terms, etc., it is recognized that methods other than displaying may be utilized to provide data. For example, the client computing device may provide the concept terms via voice activation command such that a user may hear the concept terms as opposed to reading the concept term.

Per block 714, all of the client computing devices may prompt respective users of the client computing devices to generate a second set of concept terms that are within the same category as the particular concept term of the first set using the plurality of individual characters. In some embodiments, the prompting in block 714 may include a notification to each user that the user should generate concept terms that are part of the same category and will be awarded points accordingly for generated concept terms within the same category. For example, if one of the first concept terms was "hotel," the category may be "a type of lodging". Accordingly, a user may receive points for generating concept terms that fall in the same category (e.g., motel, yurt, cabin), whereas the user may not receive points (or receive less points) for generating concept terms outside of the category (e.g., MARRIOTT) even though they may be within the same domain or be conceptually related to an associated seed concept term. In some embodiments, block 714 may not occur at all. In some embodiments, the client computing devices may prompt users to generate a second set of concept terms that are conceptually related to the particular concept term. In some embodiments, the prompting in block 714 may be the displaying or providing of various indicia as specified in block 712 such that not explicit notification is given. For example, by displaying the plurality of individual characters, the seed concept term, and a particular concept term that a user generated, then this may be sufficient enough information to "prompt" each user to generate a second set of concept terms.

Per block 716, the cognitive computing system may obtain a second list. The second list may include a second set of one or more concept terms generated by users that are transmitted from the plurality of client computing devices to the cognitive computing system (or server). When each user generates a subset or portion of the second set of concept terms, the respective client computing device may transmit each of the portion to the cognitive computing system.

Per block 718, the cognitive computing system may cause each of the client computing devices to provide a game score (a point total earned) for respective users that have generated one or more of the second set of concept terms. In some embodiments, the cognitive computing system may not necessarily cause the client computing devices to provide a game score, but the client computing devices gaming module may provide the game score on its own. In some embodiments, each user will earn higher game scores for generating concept terms that are part of the same category as the particular concept term.

Per block 720, the cognitive computing system may determine whether any of the users generated concept terms (first or second set of one or more concept terms) that were part of a new category. A "new" category may be a category that the cognitive computing system (e.g., the POS tagger 218) has not yet generated. For example, referring back to FIG. 4, the cognitive computing system, per block 406, may first generate a first set of concept terms that are associated with a seed concept terms (i.e., perform concept expansion) in order to train. In doing concept expansion, the cognitive computing system may have generated its own categories for a set of concept terms that are candidates for being conceptually related to the seed concept term. Accordingly, the when the cognitive computing system receives the plurality of lists from the plurality of client computing devices, the cognitive computing system may or may not have already generated a category for a particular set of concept terms. In various embodiments, the decision in block 720 may be as a result of users generating either the first set of concept terms and/or the second set of concept terms. For example, block 720 may be placed immediately below block 702 when the cognitive computing system obtains a plurality of lists of a first set of one or more concept terms from a plurality of client computing devices.

Per block 722, if any of the users generated concept terms that are part of a new category then the cognitive computing system may cause the client computing device(s) to increase the game score for those respective users that generated concept term(s) that are part of a new category or subcategory. This may incentivize users to generate as many different types of concept terms as possible. Generating as many different types of concept terms as possible may in turn help the cognitive computing system have a more robust concept expansion system such that any given set of seed concept terms may be expanded to several concept terms that would have otherwise not be available without incentivizing users to create as many categories as possible.

Per block 724, the cognitive computing system or other server computing device may determine whether each of the second set of concept terms were generated above a quantity threshold and score each concept term accordingly for validation. Block 724 may be analogous to block 422 of FIG. 4. Per block 726 the cognitive computing system or other server computing device may determine the subject matter expertise of each user according to the domain and score each of the user's generated concept terms accordingly for validation. Block 726 may be analogous to block 424 of FIG. 4. In some embodiments, the cognitive computing system may determine whether any concept terms that have already been generated by the cognitive computing system were not included in the second set of one or more concept terms that the users have generated. This may be analogous to block 416 of FIG. 4. If there were some concept terms that were generated by the cognitive computing system but which were not generated by any of the client computing devices, then the cognitive computing system or server computing device may reduce a validity score for such concept terms.

Per block 728, the cognitive computing system or server computing device may calculate final validity score totals, which is analogous to block 426 of FIG. 4. In some embodiments, the final validity score totals may be based solely on the second set of concept terms that were generated and whether the second set is with a particular category. In some embodiments, the final validity score total may include concept terms that were generated by users that are candidates for being conceptually related to a seed concept term (e.g., FIG. 4). Per block 730, the cognitive computing system or server computing device may determine which of the first and second set of concept terms are valid (which may include the first and second set of concept terms as specified in FIG. 4). Per block 732, the cognitive computing system may update itself by storing or retaining the valid concept terms to the corpus of the cognitive computing system (analogous to block 430 of FIG. 4). Block 732 may be performed to train the cognitive computing system for future concept expansion runs.

FIG. 8 is a diagram of an example client computing device game GUI that includes a user-generated concept term and individual characters for use in generating expanded concept terms of the user-generated concept term, according to embodiments. The client computing device 800 may include a header 802A and within the header 802A the user-generated concept term of MARRIOTT 802A1 may be displayed as well as the seed concept term of hotel 802A2. In some embodiments, the seed concept term of hotel 802A2 is not displayed or provided.

In some embodiments, FIG. 8 may be an extension of the game GUI as illustrated in FIG. 5 for a particular user. For example, as illustrated in FIG. 5 a user may be prompted to generate a set of concept terms that are candidates for being conceptually related to the seed concept term of "hotel." The user may accordingly generate the concept terms of "inn," "cabin," "motel," "yurt," "MARRIOTT," and "ORBITZ." In response to the user generating these concept terms, the client computing device 500 may transmit (e.g., via the gaming module 136 of FIG. 1) each of the concept terms to a cognitive computing system wherein the cognitive computing system categorizes (e.g., via the POS tagger 218) each of the concept terms as described above. For example, the cognitive computing system may categorize each of the concept terms of "inn," "cabin," "motel," and "yurt" as a "type of lodging," whereas the cognitive computing system may categorize the concept term of "MARRIOTT" as a "name of a place of lodging." The cognitive computing system may further categorize the concept term of ORBITZ as a "service for booking travel-related items" (which includes hotels). Therefore, each of the generated concept terms may belong to three categories.

In some embodiments, in response to the cognitive computing system categorizing the concept terms, the cognitive computing system may then transmit each of the identified categories and concept terms back to the client computing device. For example, using the illustration above, the cognitive computing system may transmit the three categories and each of the associated concept terms (e.g., inn, cabin, motel, yurt, MARRIOTT, and ORBITZ) back to the client computing device 500. In response to the transmitting, a GUI of the client computing device 500, for example, may display (e.g., via the gaming module 136) each of the three categories and under each category each of the concept terms in which the user generated may be listed under each category such that it is evident what particular category each generated concept term belongs to.

As described above, the client computing device 500 may then prompt (e.g., notify via a message) a user to select a concept term that he or she generated in order to generate another set of concept terms that are within the same category as (or conceptually related to) the selected concept term. The client computing device 500 may then receive a user request for a particular concept term and the client computing device 500 may then, in response to the receiving of the request, display the plurality of individual characters and the particular selected concept term. For example, the client computing device 800 may be the client computing device 500 at a second subsequent time after the user has generated concept terms that are candidates for being conceptually related to the seed concept term of "hotel." Therefore, the user may have selected the concept term of "MARRIOTT," which may have been generated via the gesture 504F at the first time according to FIG. 5. At the second time, the computing device 800 may then display at least the concept term of MARRIOTT 602A1 and the plurality of individual characters 802C. The client computing device 800 may then prompt the user to generate a second set of concept terms that are conceptually related to the selected concept term of MARRIOTT 802A1 in which the user generated at the first time according to FIG. 5. In some embodiments, the client computing device 800 may prompt the user to generate the second set of concept terms that are not only conceptually related to the concept term of MARRIOTT 602A1, but are within the same category as MARRIOTT (i.e., a name of a place of lodging). Accordingly, the user may generate the concept terms of HILTON via the gesture 604A and COURTYARD via the gesture 604B. HILTON and COURTYARD may also be associated with particular businesses that are names of places of lodging. In some embodiments, as described above, a user may not necessarily utilize hand gestures on a touch surface to generate concept terms but rather utilize pointers (e.g., a mouse) or keyboard controls to generate concept terms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

obtaining, by a cognitive computing system including a natural language processing system, a first list that includes a first set of one or more concept terms from an information corpora of the cognitive computing system, the first set of one or more concept terms are transmitted from a first client computing device to the cognitive computing system, the first set of one or more concept terms are candidates for being conceptually related to a seed concept term, wherein prior to the obtaining, the first client computing device provides a first plurality of individual characters and the seed concept term to a first user using the first client computing device, the first client computing device prompts the first user to generate a second set of one or more concept terms that are conceptually related to the seed concept term using one or more of the first plurality of individual characters;

determining, by the natural language processing system and in response to the obtaining, one or more particular categories to which each of the first set of one or more concept terms belongs, wherein each of the particular categories is a distinct class that includes an identification, the identification describes a specific meaning for each of the first set of one or more concept terms;

associating, in response to the determining that one or more particular categories to which each of the first set of one or more concept terms belongs, at least one of the second set of one or more concept terms with the one or more particular categories of the first set of one or more concept terms;

causing, in response to the associating the second set of one or more concept terms with the one or more particular categories of the first set of one or more concept terms, the client computing device to increase a game score for the first user by a first amount, the game score corresponding to a point total earned by the first user for generating the second set of one or more concept terms;

determining that at least one of the particular categories is a new category that the cognitive computing system has not yet generated;

associating, in response to the determining that at least one of the particular categories is a new category, at least one of the second set of one or more concept terms with the new category;

causing, in response to the associating at least one of the second set of one or more concept terms with the new category, the client computing device to further increase the game score for the first user by a second amount that is different than the first amount; and training the cognitive computing system by updating the first set of one or more concept terms in the information corpora to include one or more of the second set of one or more concept terms that the cognitive computing system can use for a subsequent execution of the method.

2. The method of claim 1, wherein the determining one or more particular categories includes:

identifying a first definition for each of the first set of one or more concept terms, the first definition including a first part of speech;

identifying a second definition for the seed concept term, the second definition including a second part of speech;

determining, by at least comparing the first definition with the second definition, a relationship between the seed concept and each of the first set of one or more concepts; and determining the one or more particular categories based on at least the determining a relationship.

3. The method of claim 1, further comprising:

causing, by the cognitive computing system, the first client computing device to provide a second plurality of individual characters;

causing, by the cognitive computing system, the first client computing device to provide one of the first set of concept terms; and causing, by the cognitive computing system, the first client computing device to provide the seed concept term, wherein the first client computing device prompts the first user to generate a second set of one or more concept terms that are within a same category as the one of the first set of concept terms term using one or more of the second plurality of individual characters.

4. The method of claim 3, further comprising:

obtaining, by the cognitive computing system, a second list from the first client computing device, the second list including the second set of one or more concept terms;

identifying, by the cognitive computing system, a domain associated with the one or more particular categories, the domain corresponding to a field of knowledge;

identifying, by the cognitive computing system, a subject matter expertise of the first user;

comparing, by the cognitive computing system, the subject matter expertise of the first user with the domain; and providing a validity score for the second set of one or more concept terms based on the comparing the subject matter expertise of the first user with the domain, the validity score corresponding to scoring the second set of one or more concept terms to determine whether the second set of one or more concept terms are utilized by the cognitive computing system for concept expansion, and wherein concept expansion is a process of inputting a set of seed concept terms that are expanded by the cognitive computing system to a more complete set of concept terms.

5. The method of claim 3, further comprising:

causing, by the cognitive computing system and prior to the causing the first client computing device to provide a second plurality of individual characters, the first client computing device to display the one or more particular categories to which each of the first set of one or more concept terms belongs; and causing, by the cognitive computing system and prior to the causing the first client computing device to provide a second plurality of individual characters, the first client computing device to display the each of the first set of one or more concept terms.

6. The method of claim 1, further comprising:

determining that the second set of one or more concept terms does not include all of the first set of one or more concept terms;

causing, in response to the determining that the second set of one or more concept terms does not include all of the first set of one or more concept terms, the client computing device to decrease the game score for the first user.

7. A system comprising:
a computing device having a processor; and
a computer readable storage medium having program instructions embodied therewith, the program instructions executable by the processor to cause the system to:
display a first plurality of individual characters;
display a first seed concept term, the first seed concept term to train a cognitive computing system including a natural language processing system, wherein the cognitive computing system analyzes the first seed concept term to generate a first set of one or more concept terms from an information corpora of the cognitive computing system that are candidates for being conceptually related to the first seed concept term;
display a particular concept term of a second set of one or more concept terms, wherein the particular concept term is generated by a first user, the particular concept term is assigned to a particular category by the natural language processing system, wherein the particular category is a distinct class that includes an identification, the identification describes a specific meaning for the particular concept term;
prompt the first user to generate a third set of one or more concept terms that are within the particular category as the particular concept term using one or more of the first plurality of individual characters;
provide a game score to the first user, the game score corresponding to a point total earned by the first user for generating the third set of concept terms;
increasing the game score for each of the second set of concept terms that is included in the third set of concept terms by a first point amount;
increasing the game score for each of the third set of concept terms that is not included in the second set of concept terms by a second point amount that is different than the first point amount; and
train the cognitive computing system by updating the first set of one or more concept terms in the information corpora to include one or more of the second set of one or more concept terms that the cognitive computing system can use for a subsequent execution of the program instructions.

8. The system of claim 7, wherein the program instructions executable by the processor further cause the system to obtain a list of the third set of concept terms.

9. The system of claim 8, wherein the program instructions executable by the processor further cause the system to transmit the list of the third set of concept terms to the cognitive computing system, wherein the cognitive computing system determines, by comparing the first set of concept terms with the third set of concept terms, that one of the first set of concept terms is not included on the list, the cognitive computing system further providing a validity score for the third set of concept terms based on the determining that one of the first set of concept terms is not included on the list.

10. The system of claim 7, wherein the program instructions executable by the processor further cause the system to display a pictorial representation of a domain, the domain for use in providing a context for the particular category.

11. The system of claim 7, wherein the program instructions executable by the processor further cause the system to display the particular concept term within a sentence to indicate a domain, the domain for use in providing a context for the particular category.

12. The system of claim 7, wherein the first plurality of individual characters are displayed within in a two-dimensional array of respective cells, the third set of concept terms each being generated by connecting one or more of the respective cells.

13. The system of claim 7, wherein the program instructions executable by the processor further cause the system to decrease the game score for each of the second set of concept terms that is not included in the third set of concept terms by a third point amount.

14. A computer program product comprising a computer readable storage medium having program instructions embodied therewith, the program instructions executable by a cognitive computing system including a natural language processing system to cause the cognitive computing system to perform a method, the method comprising:
obtaining a first list that includes a first set of one or more concept terms from an information corpora of the cognitive computing system, the first set of one or more concept terms are transmitted from a plurality of client computing devices, the first set of one or more concept terms are candidates for being conceptually related to a seed concept term, wherein prior to the obtaining, the plurality of client computing devices provide a first plurality of individual characters and a seed concept term to a plurality of respective users of the plurality of client computing devices, the plurality of client computing devices prompt the plurality of respective users to generate the first set of one or more concept terms that are conceptually related to the seed concept term using one or more of the first plurality of individual characters;
determining, in response to the obtaining and by the natural language processing system, one or more particular categories to which each of the first set of one or more concept terms belongs, wherein each of the particular categories is a distinct class that includes an identification, the identification describes a specific meaning for each of the first set of one or more concept terms;
associating, in response to the determining that one or more particular categories to which each of the first set of one or more concept terms belongs, at least one of the second set of one or more concept terms with the one or more particular categories of the first set of one or more concept terms;
causing, in response to the associating the second set of one or more concept terms with the one or more particular categories of the first set of one or more concept terms, the client computing device to increase a game score for the first user by a first amount, the game score corresponding to a point total earned by the first user for generating the second set of one or more concept terms;
determining that at least one of the particular categories is a new category that the cognitive computing system has not yet generated;
associating, in response to the determining that at least one of the particular categories is a new category, at least one of the second set of one or more concept terms with the new category;
causing, in response to the associating at least one of the second set of one or more concept terms with the new category, the client computing device to further increase the game score for the first user by a second amount that is different than the first amount; and
training the cognitive computing system by updating the first set of one or more concept terms in the information corpora to include one or more of the second set of one or more concept terms that the cognitive computing system can use for a subsequent execution of the method.

15. The computer program product of claim 14, wherein the determining one or more particular categories includes:
    identifying a first definition for each of the first set of one or more concept terms, the first definition including a first part of speech;
    identifying a second definition for the seed concept term, the second definition including a second part of speech;
    determining, by at least comparing the first definition with the second definition, a relationship between the seed concept and each of the first set of one or more concepts; and
    determining the one or more particular categories based on at least the determining a relationship.

16. The computer program product of claim 14, wherein the method further comprises:
    causing the plurality of client computing devices to provide a second plurality of individual characters;
    causing the plurality of client computing devices to provide a first concept term of the first set of one or more concept terms that each respective user of the plurality of respective users has generated; and
    causing the plurality of client computing device to provide the seed concept term, wherein the plurality of client computing devices prompt the respective users to generate a second set of one or more concept terms that are within a same category as the first concept term using one or more of the second plurality of individual characters.

17. The computer program product of claim 16, wherein the method further comprises: obtaining a second list, the second list including the second set of one or more concept terms.

18. The computer program product of claim 17, wherein the method further comprises:
    determining that a particular concept term of the second set of one or more concept terms was generated by two or more of the plurality of respective users above a quantity threshold;
    in response to the determining, increasing a validity score for the particular concept term, wherein the validity score corresponds to scoring the particular concept term to determine whether the particular concept term is utilized by the cognitive computing system for concept expansion, and wherein concept expansion is a process of inputting a set of seed concept terms that are expanded by the cognitive computing system to a more complete set of concept terms which belongs to a semantic class as the set of seed concept terms.

19. The computer program product of claim 17, wherein the method further comprises:
    identifying a domain associated with one of the one or more particular categories, the domain corresponding to a field of knowledge;
    identifying a subject matter expertise of a first user of the plurality of respective users, wherein the first user generates a particular concept term of the second set of concept terms that is within the one of the one or more particular categories;
    comparing the subject matter expertise of the first user with the domain; and
    providing a validity score for the particular concept term based on the comparing the subject matter expertise of the first user with the domain, the validity score corresponding to scoring the particular concept term to determine whether the particular concept term is utilized by the cognitive computing system for concept expansion, and wherein concept expansion is a process of inputting a set of seed concept terms that are expanded by the cognitive computing system to a more complete set of concept terms.

20. The computer program product of claim 14, wherein the method further comprises:
    determining that the second set of one or more concept terms does not include all of the first set of one or more concept terms;
    causing, in response to the determining that the second set of one or more concept terms does not include all of the first set of one or more concept terms, the client computing device to decrease the game score for the first user.

* * * * *